US011396072B2

(12) United States Patent
Chavan Dafle et al.

(10) Patent No.: US 11,396,072 B2
(45) Date of Patent: Jul. 26, 2022

(54) ROBOTIC MANIPULATION OF OBJECTS USING EXTERNAL CONTACTS

(71) Applicant: Massachusetts Institute of Technology, Cambridge, MA (US)

(72) Inventors: Nikhil Chavan Dafle, Cambridge, MA (US); Alberto Rodriguez Garcia, Cambridge, MA (US); Rachel Holladay, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 273 days.

(21) Appl. No.: 16/542,677

(22) Filed: Aug. 16, 2019

(65) Prior Publication Data

US 2020/0055152 A1     Feb. 20, 2020

Related U.S. Application Data

(60) Provisional application No. 62/765,255, filed on Aug. 20, 2018.

(51) Int. Cl.
*B25J 3/00* (2006.01)
*G01B 5/24* (2006.01)
*B23Q 7/04* (2006.01)

(52) U.S. Cl.
CPC ............... *B23Q 7/04* (2013.01); *B25J 3/00* (2013.01); *G01B 5/241* (2013.01)

(58) Field of Classification Search
CPC ..................................... B25J 3/00; G01B 5/24
See application file for complete search history.

(56) References Cited

U.S. PATENT DOCUMENTS

| 4,740,025 | A | 4/1988 | Nelson | |
|---|---|---|---|---|
| 9,333,649 | B1* | 5/2016 | Bradski | G06V 10/60 |
| 9,687,982 | B1* | 6/2017 | Jules | B25J 9/1612 |
| 9,694,495 | B1* | 7/2017 | Edsinger | G05B 19/423 |
| 10,005,627 | B2 | 6/2018 | Girtman et al. | |
| 2012/0065779 | A1* | 3/2012 | Yamaguchi | B25J 9/1612 700/259 |
| 2013/0343640 | A1* | 12/2013 | Buehler | G06F 17/00 382/155 |
| 2017/0036354 | A1* | 2/2017 | Chavan Dafle | B25J 15/0042 |

(Continued)

OTHER PUBLICATIONS

International Search Report and Written Opinion for International Application No. PCT/US2019/046780 dated Nov. 6, 2019.

(Continued)

*Primary Examiner* — Kira Nguyen
(74) *Attorney, Agent, or Firm* — Wolf, Greenfield & Sacks, P.C.

(57) ABSTRACT

Embodiments described herein relate to systems and methods for manipulating the position and/or orientation of an object while it is held in a robotic gripper. In one such embodiment, one or more physically possible and stable displacements for moving an object relative to a gripper using one or more frictional pushes may be determined and applied to the object to move the object from a first position and orientation to a second position and orientation while the object is held by the gripper. In certain embodiments, the physically possible and stable displacements may be determined using an appropriate motion cone approximation.

52 Claims, 11 Drawing Sheets

(56) References Cited

U.S. PATENT DOCUMENTS

| 2018/0193999 | A1 | 7/2018 | Jacobsen et al. | |
|---|---|---|---|---|
| 2018/0250086 | A1* | 9/2018 | Grubbs | A61B 34/77 |
| 2018/0281201 | A1* | 10/2018 | Rosenstein | B25J 9/1676 |

OTHER PUBLICATIONS

[No Author Listed], RSS 2018—In-Hand Manipulation via Motion Cones (Best Student Paper Award). YouTube. Jul. 21, 2018. https://www.youtube.com/watch?v=VDO8QMuYhc&feature=youtu.be [last accessed Mar. 11, 2020]. 51 pages.

Chavan-Dafle et al., In-hand manipulation via motion cones. arXiv preprint arXiv:1810.00219. Sep. 29, 2018:10 pages.

Chavan-Dafle et al., Sampling-based planning of in-hand manipulation with external pushes. arXiv preprint arXiv:1707.00318. Nov. 2, 2017:1-16.

Hogan et al., Feedback control of the pusher-slider system: A story of hybrid and underactuated contact dynamics. arXiv preprint arXiv:1611.08268. Nov. 24, 2016:1-16.

Kolbert et al., Experimental validation of contact dynamics for in-hand manipulation. arXiv preprint arXiv:1702.07252. Oct. 31, 2017:1-12.

Lynch et al., Manipulation and active sensing by pushing using tactile feedback. Proceedings of the IEEE/RSJ International Conference on Intelligent Robots and Systems. Jul. 7, 1992;1:416-421.

Lynch et al., Stable pushing: Mechanics, controllability, and planning. The International Journal of Robotics Research. Feb. 1996;15(6):533-556.

Shi et al., Dynamic in-hand sliding manipulation. IEEE Transactions on Robotics. Aug. 2017;33(4):778-795.

Xydas et al., Modeling of contact mechanics and friction limit surfaces for soft fingers in robotics, with experimental results. The International Journal of Robotics Research. Sep. 1999;18(9):941-50.

Chavan Dafle et al., Prehensile pushing: In-hand manipulation with push-primitives. In 2015 IEEE/RSJ International Conference on Intelligent Robots and Systems (IROS) Sep. 28, 2015: 9 pages.

Chavan Dafle et al., Sampling-based planning of in-hand manipulation with external pushes. CoRR, abs/1707.00318. Nov. 2, 2017:1-16.

Chavan Dafle et al., Stable prehensile pushing: In-hand manipulation with alternating sticking contacts. In 2018 IEEE International Conference on Robotics and Automation (ICRA) May 21, 2018:254-261.

Dogar et al., Push-grasping with dexterous hands: Mechanics and a method. In 2010 IEEE/RSJ International Conference on Intelligent Robots and Systems (IROS). Oct. 18, 2010:2123-2130.

PCT/US2019/046780, Jun. 11, 2019, International Search Report and Written Opinion.

* cited by examiner

ROBOTIC MANIPULATION OF OBJECTS USING EXTERNAL CONTACTS

CROSS-REFERENCE TO RELATED APPLICATIONS

This application claims the benefit of priority under 35 U.S.C § 119(e) of U.S. Provisional Application 62/765,255 filed Aug. 20, 2018.

FIELD

The present application relates to robotic manipulation of objects using external contacts.

BACKGROUND

A frictional contact may apply a frictional push to an object. A motion cone is a set of feasible motions that a rigid body can follow under the action of the frictional push. It can be thought of as a geometric representation of the underactuation inherent to frictional contacts. Since contacts can only push, and since friction is limited, a contact can move an object only along a limited set of directional rays. Further, motion cones abstract the algebra involved in simulating frictional contact dynamics. A contact force on the inside of a friction cone produces sticking behavior, and leads to motion rays on the inside of the motion cone. The construction of motion cones has been generalized to line contacts in a horizontal plane. Thus, motion cones have been used for planning pushing trajectories for planar horizontal pushing tasks without the complexities of standard complementarity formulations of contact dynamics.

SUMMARY

Some aspects of the present application relate to a method of manipulating an object while it is held in a gripper, The method may include determining a set of physically possible and stable displacements for moving the object relative to the gripper using a frictional push applied to the object while the object is held by the gripper. The method may further comprise applying a displacement to the object relative to the gripper according to one of the set of physically possible displacements using the frictional push.

In some embodiments, applying the displacement to the object may further comprise at least one pusher frictionally pushing the object relative to the gripper. In some embodiments, the at least one pusher may be a robot arm. In some embodiments, the at least one pusher may be a stationary surface the object is frictionally pushed against.

In some embodiments, determining the set of displacements may comprise generating a motion cone comprising all physically possible displacements to be applied.

In some embodiments, generating the motion cone may comprise factoring in gravity, a mass of the object, a coefficient of friction between the gripper and object, a coefficient of friction between the object and the pusher and/or a position and orientation of the object relative to the gripper. in some embodiments, determining the set of displacements may further comprise determining an approximation of the motion cone. In some embodiments, the approximation of the motion cone is a polyhedral cone approximation of the motion cone.

In some embodiments, the method may further comprise iteratively sampling from a set of possible displacements to choose a displacement for applying to the object using a frictional push. In some embodiments, iteratively sampling may comprise random sampling. In some embodiments, random sampling may comprise prioritizing samples according to a cost-analysis system.

In some embodiments, the method may further comprise varying a force exerted by the gripper on the object. In some embodiments, varying the force exerted by the gripper on the object may further comprise modifying the set of physically possible displacements for moving the object relative to the gripper using a frictional push applied to the object.

Some aspects of the present application relate to a method for manipulating an object held in a gripper from a first position to a second position relative to the gripper. In some embodiments, the method may comprise planning each displacement of a sequence of displacements for the object relative to the gripper.

In some embodiments, planning each displacement may comprise determining a set of physically possible displacements for moving the object relative to the gripper using a frictional push applied to the object, which may be based at least on a current position and orientation of the object relative to the gripper within the sequence.

In some embodiments, planning each displacement may further comprise selecting a displacement of the object relative to the gripper according to one of the set of physically possible displacements. In some embodiments, planning each displacement may further comprise adding the selected displacement to the sequence of displacements.

In some embodiments, the method may further comprise executing the sequence of displacements such that the object moves from the first position to the second position by applying a sequence of frictional pushes to the object while the object is held by the gripper.

In some embodiments, executing the sequence of displacements may comprise a pusher frictionally pushing the object relative to the gripper. In some embodiments, executing the sequence of displacements may comprise the gripper frictionally pushing the object against a stationary surface.

In some embodiments, determining the set of displacements may comprise generating a motion cone comprising physically possible and stable displacements for at least the first position and orientation of the object relative to the gripper. In some embodiments, generating a motion cone may further comprise factoring in gravity, a mass of the object, a coefficient of friction between the gripper and object, a coefficient of friction between the object and the pusher, and/or the current position and orientation of the object relative to the gripper.

In some embodiments, adding the selected displacement may further comprise sampling from a set of displacements, filtering the set of displacements according to a predetermined cost leaving only a filtered set of displacements, and choosing the selected displacement according to a closest displacement in the motion cone to a displacement from the filtered set.

In some embodiments, adding the selected displacement to the sequence of displacements may further comprise updating a list of positions comprising at least the first position to include a new position according to the selected displacement. In some embodiments, choosing the selected displacement may further comprise choosing a position from the list of positions closest to the displacement from the filtered set from which to apply the displacement.

In some embodiments, determining the motion cone may further comprise modifying the set of physically possible displacements for moving the object relative to the gripper using a frictional push applied to the object. in some embodiments, executing the sequence of displacements may further comprise varying a force exerted by the gripper on the object during at least one of the sequence of displacements.

Some aspects of the present application relate to a system for manipulating an object held in a gripper. The system may comprise an actuator configured to control motion of the gripper and a processing unit in communication with the actuator.

In some embodiments, the processing unit may be configured to determine a set of physically possible displacements for moving the object relative to the gripper using a frictional push applied to the object. In some embodiments, the processing unit may be further configured to direct the actuator to apply a displacement to the object relative to the gripper according to one of the set of physically possible displacements using the frictional push while the object is held by the gripper.

In some embodiments, the system may further comprise at least one pusher configured to frictionally push the object relative to the gripper. In some embodiments, the at least one pusher may be a robot arm. In some embodiments, the at least one pusher may be a stationary surface the object is frictionally pushed against.

In some embodiments, the processing unit may be further configured to generate a motion cone comprising physically possible and stable displacements. In some embodiments, the processing unit may be further configured to factor in gravity, a mass of the object, a coefficient of friction between the gripper and object, a coefficient of friction between the object and the pusher, and a position and orientation of the object relative to the gripper.

In some embodiments, the processing unit may be further configured to calculate an approximation of the motion cone. In some embodiments, the approximation of the motion cone may be a polyhedral cone approximation of the motion cone.

In some embodiments, the processing unit may be further configured to iteratively sample from the set of displacements and choose a displacement to be applied using a frictional push. In some embodiments, the processing unit may be configured for random sampling. In some embodiments, the processing unit may be further configured to prioritize samples according to a cost-analysis system.

In some embodiments, the actuator may be configured to vary a force exerted by the gripper on the object, In some embodiments, the processing unit may be further configured to vary the force exerted by the gripper on the object when determining the motion cone, thereby modifying the set of physically possible and stable displacements for moving the object relative to the gripper using a frictional push applied to the object.

Some aspects of the present application relate to a system for manipulating an object held in a gripper. The system may comprise an actuator configured to control motion of the gripper and a processing unit in communication with the actuator.

In some embodiments, the processing unit may be configured to plan each displacement of a sequence of displacements for the object relative to the gripper. To plan each displacement the processing unit may be further configured to: determine a set of physically possible and stable displacements for moving the object relative to the gripper using a frictional push applied to the object based at least on a current position and orientation of the object relative to the gripper within the sequence; select a displacement of the object relative to the gripper according to one of the set of physically possible and stable displacements; and add the selected displacement to the sequence of displacements. The processing unit may also be configured to direct the actuator to apply the sequence of displacements to the object relative to the gripper using the frictional push while the object is held by the gripper.

In some embodiments, the system may further comprise at least one pusher configured to frictionally push the object relative to the gripper. In some embodiments, the at least one pusher may be a robot arm. In some embodiments, the at least one pusher may be a stationary surface.

In some embodiments, the processing unit may be further configured to generate a motion cone comprising physically possible and stable displacements. In some embodiments, the processing unit may be further configured to factor in gravity, a mass of the object, a coefficient of friction between the gripper and object, a coefficient of friction between the object and the pusher, and/or the current position and orientation of the object relative to the gripper.

In some embodiments, the processing unit may be further configured to calculate an approximation of the motion cone. In some embodiments, the approximation of the motion cone may be a polyhedral cone approximation of the motion cone.

In some embodiments, the processing unit may be further configured to iteratively sample from the set of displacements and choose a displacement to be applied using a frictional push. In some embodiments, the processing unit may be configured for random sampling. In some embodiments, the processing unit may be further configured to prioritize samples according to a cost-analysis system.

In some embodiments, the actuator may be configured to vary a force exerted by the gripper on the object. In some embodiments, the processing unit may be further configured to vary the force exerted by the gripper on the object when determining the motion cone, thereby modifying the set of physically possible and stable displacements for moving the object relative to the gripper using a frictional push applied to the object.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
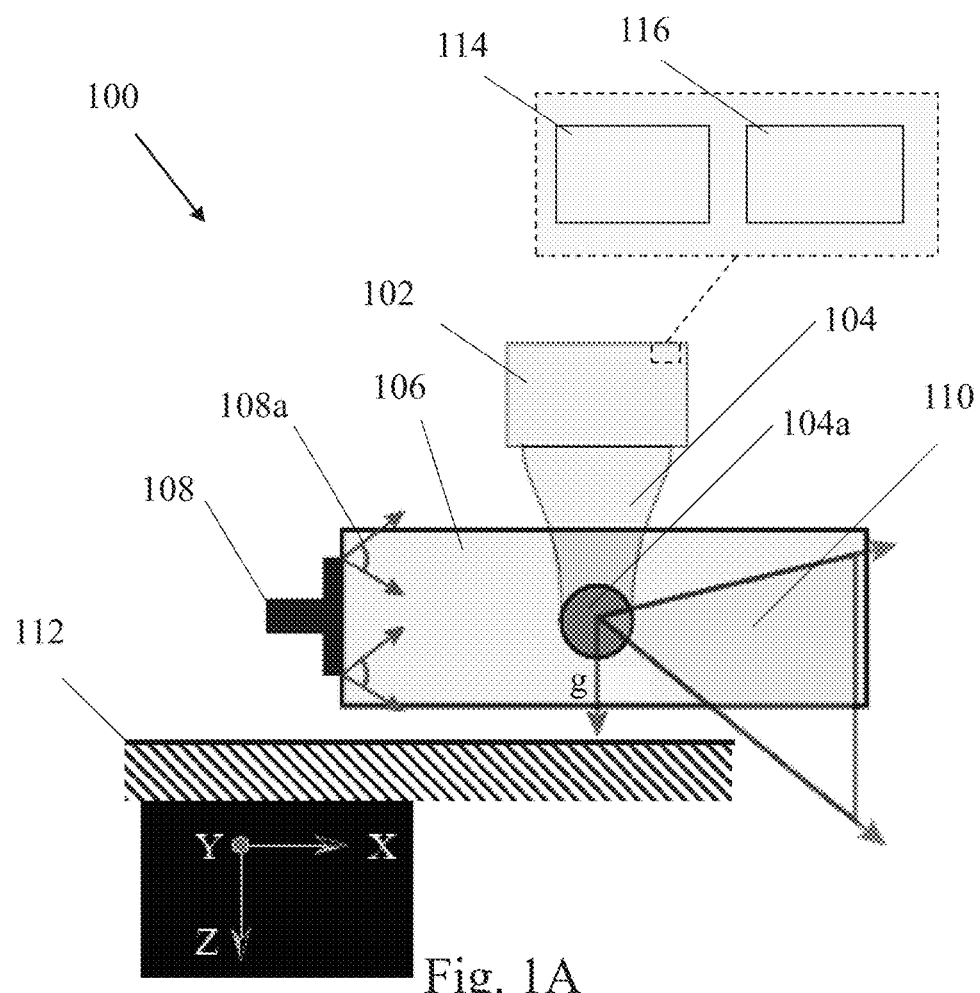
FIG. 1A is a side view showing an object held in a gripper along with one or more pushers and a motion cone resulting from frictional forces applied to the object by the depicted pusher.

Autonomous calculation, planning and execution of motions applied by a robot to objects within its grasp have many diverse applications. In one application, manufacturing by robots may require robots to autonomously adapt to products to be manufactured. For example, one robot may be used to manufacture several types of products and/or may be used to handle multiple components during the manufacture of a product. Thus, the Inventors have recognized that it may be desirable for the robot to be capable of adapting to use with multiple products and/or components without the need for specialized tooling and/or planning for each product and/or component.

In view of the above, the Inventors have recognized the benefits associated with manipulating objects using frictional pushes applied to an object relative to a gripper while the object is held by the gripper. In some embodiments, a desired relative movement between an object and a gripper that holds the object may use several frictional pushes applied to the object in order to move the object from an initial position to a target position relative to the gripper.

In some instances, robotic systems capable of autonomously manipulating objects within their grasp may be desirable to reduce the need for human planning and intervention. Thus, in some instances a robotic system may be configured appropriately to provide for the calculation, planning, and execution of frictional pushes to be applied to an object held within the grasp of a gripper to move the object from an initial position to a target position. In certain embodiments, the robotic system may be capable of producing entire sequences of calculated frictional pushes to move the object from a first position to a second position relative to the gripper.

The disclosed methods and systems may be used to manipulate an object relative to a gripper grasping the object in a number of different applications. For example, functionalities useful for robotic tools in manufacturing settings as primarily described herein may also be used for consumer and/or professional as well including, for instance, even toy robots for entertainment purposes. Thus, it should be understood that the disclosed methods and systems are not limited to use for any particular application.

Frictional pushing is typically implemented in two dimensions by applying a pushing force to an object that is parallel to a horizontal surface an object is supported on. Due to the relatively simply motions applied in such an arrangement, the computations and implementation strategies used to apply such a concept are relatively straight forward. In contrast, using frictional pushes in a three dimensional environment where an object slides relative to the contacts of a gripper it is held between while being frictionally pushed relative to the gripper presents a host of challenges that have precluded the use of frictional pushes for manipulating objects outside of simple planar arrangements. For example, frictional pushing in three dimensions may introduce a need to account for gravitational wrenches twisting the object in undesired directions. Gravitational wrenches may need to be met with balanced wrenches within the applied frictional push. Additionally, determining a three dimensional motion cone is costly in terms of computing resources owing to the larger dimensional space. For example, the three dimensional motion cone may have low-curvature surfaces which may be nonlinear. Thus, the disclosed methods and systems described herein present systems and methods for simplifying and robustly applying frictional pushing strategies for the manipulation of objects held by a gripper in a three dimensional environment.

The Inventors have recognized that currently implemented computational methods for approximating motion cones sacrifice either efficiency or realism of the dynamics of a system. This may be undesirable for several reasons. For example, sacrificing efficiency may result in long computation time and hogging of resources. Additionally, sacrificing realism in rougher approximations may provide less resolution in the motion cone and may omit optimal components within the motion cone which may be used to control the relative motion of an object. Accordingly, the Inventors have recognized an approximation that may be beneficially applied to systems such as a robotic gripper grasping an object between two or more contacts where the object may frictionally slide between the contacts using a frictional push. Specifically, the Inventors have recognized and appreciated that the quasi-static movement assumption may be employed in order to determine stable frictional pushes in three dimensions. Additionally, the Inventors have recognized and appreciated that three dimensional motion cones which account for gravity may thus be approximated quickly and in high resolution. For example, a polyhedral approximation may be employed in accordance with some embodiments of the presently disclosed methods and systems as described in further detail below.

The Inventors have recognized and appreciated that motion cones as described herein may be used to determine physically possible and stable displacements using frictional pushes which may be applied to objects held by grippers. For example, as elaborated on further below, frictional pushes may be used to apply certain movements relative to an object within a certain range of motions without slipping which may reduce the ability of a robotic system to accurately control the position and orientation of an object held in a gripper. Accordingly, a physically possible and stable displacement applied using a frictional push may refer to a pushing displacement that is capable of being applied to the object to displace the object relative to a gripper holding the object while the object remains substantially stationary (i.e., not slipping) relative to a pusher it is positioned against due to the effects of friction between the object and the pusher. Objects may thereby change position and/or orientation relative to a gripper using frictional pushes as desired. As a few examples, objects may be slid relative to and/or rotated about an axis defined between at least two opposing contacts of a gripper grasping an object using the disclosed methods and systems.

It should be understood that the term "pusher" may correspond to a variety of different structures as detailed herein. For example, frictional pushes may be applied to an object by a pusher to provide a desired relative movement between an object and a gripper that holds the object. In one embodiment, this relative movement may be provided by the gripper positioning the object against a stationary pusher such as a stationary surface in the surrounding environment, and the gripper may be moved relative to the pusher while the object is held substantially stationary against the pusher. A pusher in such an embodiment may thus correspond to any appropriate stationary surface. In another embodiment, the pusher may move relative to the gripper to apply the desired frictional push to an object in contact with the pusher. For example, a pusher may correspond to a second robot, a second arm of the same robot, and/or a displaceable surface which the object is positioned against. Thus, the pusher may apply the frictional push to the object while the gripper remains still. Of course combinations in which a gripper and pusher are moved simultaneously are also contemplated as the disclosure is not so limited. Further, any number of suitable methods or systems for applying displacements may be used without departing from the scope of the current disclosure.

The Inventors have recognized and appreciated that path planning techniques may be employed to calculate an optimal path from an initial position and/or orientation of an object held by a gripper to a goal position and/or orientation. For example, a sequence of frictional pushes along a calculated trajectory may be determined and subsequently executed according to the present disclosure. In one embodiment, a random sampling and filtering framework may be incorporated to iteratively solve for such an optimal path. In such a framework, samples may be filtered and/or prioritized according to space-cost. For example, positions and orientations may be sampled, filtered and added to the trajectory such that a total space-cost of the trajectory may be minimized as detailed further below.

A robot arm may grasp an object in a certain position and/or orientation within a gripper. The robot may position the object against a pusher resulting in a frictional contact. The frictional contact may provide a frictional push to provide relative movement between a gripper of the object and the pusher which may allow the robot to adjust a position and/or orientation of the object relative to the gripper that holds the object. In some embodiments, this process may be done autonomously by the robot, such that the robot both determines and executes one or more frictional pushes to reposition and/or reorient the object relative to the gripper. Determination of the one or more frictional pushes by the robot may include determining a motion cone consisting of possible frictional pushes to apply to the object held in the gripper. The robot may then select one of the frictional pushes in the motion cone before executing it.

In some embodiments, a motion cone may be determined using an assumed range of frictional forces. For example, an upper threshold frictional force and/or a lower threshold frictional force may be assumed, calculated, or otherwise determined. One or both of these threshold frictional forces may be used to determine a motion cone that may be more conservative than a motion cone determined using more parameters, and may be implemented using the same methods and algorithms disclosed relative to the other embodiments using these conservative assumptions regarding frictional forces. Such conservative motion cones may provide increased robustness when implementing robotic controls in manufacturing and other appropriate environments.

In some embodiments, an object may be grasped by a gripper in an initial position and/or orientation and it may be desirable to displace the object relative to the gripper to place the object in a goal position and/or orientation. However, due to specific object geometries, in some applications, the goal position and/or orientation may be out of immediate reach based on a single calculated motion cone starting from the initial position. However, the goal position and/or orientation may be reachable using a planned trajectory or sequence of frictional pushes applied in a plurality of directions. For example, after applying a first frictional push in a first direction from a first position and/or orientation another motion cone may be calculated at the new second position and/or orientation such that the goal position and/or orientation is located within the new motion cone and may thereby be reached using a frictional push applied to the object in the second position and/or orientation towards the goal position and/or orientation in a second direction. Alternatively, subsequent intermediate frictional pushes at subsequent intermediate positions may be applied to the object in addition to the second frictional push to reach the final goal position and/or orientation. Motion cones may be calculated at each intermediate frictional push and added to the sequence for execution. Moreover, the sequence may be calculated in its entirety from the initial position and/or orientation up until the goal position and/or orientation, and then the entire sequence may be executed. As detailed further below, in some embodiments, the sequence of displacements may be calculated using a framework for randomly sampling possible positions and/or orientations and filtering the sampled positions and/or orientations to find an optimal path to the goal position and/or orientation. Positions and/or orientations may be iteratively sampled whenever a new frictional push is added to the sequence. Alternatively, in some embodiments, the sequence of displacements may be calculated and applied in real time as the disclosure is not so limited.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Figure 1B:
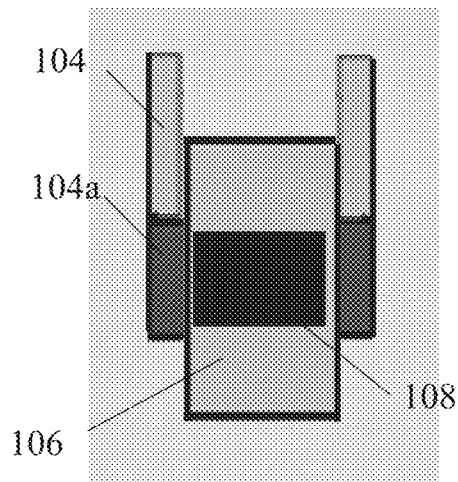
FIG. 1B is a front view showing the object, gripper and pusher of FIG. 1A.

Some aspects of the present application relate to a system and an associated method for manipulating an object held in a gripper. As shown in FIGS. 1A-1B a robotic system 100 may include a gripper 102 with two or more fingers 104 located on opposing sides of the gripper. Each finger may include a contact 104a for contacting an object 106 held in the gripper. For example, the fingers of the gripper may be displaced towards each other to contact and grasp an object in an initial position and orientation with the object compressed between the contacts of the two or more fingers of the gripper. In one specific embodiment, the gripper 104 may be a two-pronged gripper with two displaceable fingers that may be configured to be displaced towards each other to contact and grip two opposing sides of the object. However, the gripper may take any number of forms without departing from the scope of the present disclosure.

While an object 106 is gripped between the fingers 104 of a gripper 102, an external frictional push may be applied to the object by a pusher 108 as indicated by arrows 108a. The frictional push may be applied by providing a relative displacement between the pusher and the gripper. As previously described, this relative displacement may be provided by displacing the pusher and/or displacing the gripper as the disclosure is not limited to how the desired displacement between the pusher and gripper is applied. In either case, the object may slide and/or rotate relative to the contacts of the fingers grasping the object such that the object slides and or/rotates relative to the gripper to adjust its position and/or orientation within the gripper. In some embodiments, the object may remain remaining substantially stationary relative to the pusher during this displacement. For example, in one embodiment, a robot arm attached to the gripper, not depicted, may terminate in the gripper 102 which may hold the object 106. The robot arm may comprise a processing unit 114 (i.e. one or more processors and associated non-transitory computer readable medium, including instructions to execute the disclosed methods and algorithms disclosed herein) and one or more actuators 116 that are controlled by the processing unit to control a position and/or orientation of the gripper during operation. The robot arm may thus control a position and orientation of the gripper relative to the pusher to apply the desired frictional push to the object. Alternatively, the pusher 108 may be displaced instead to provide the desired displacement. For example, the pusher may correspond to a separate robotic arm, a surface connected to an actuator with one or more degrees of freedom, and/or any other appropriate structure capable of providing the desired displacement.

In the above embodiment, a pusher 108 in contact with the object 106 is used to apply a desired displacement to the object. However, the current disclosure is not limited to use with pushers specifically positioned and/or constructed for use with the disclosed objects and/or grippers. For example, as shown in the figure, an environment surrounding a gripper may include one or more surfaces, including surface 112, which as depicted in the figure may correspond to a horizontal surface underlying the object. In some instances, the object may be brought into contact with the surface and the gripper may be moved relative to the surface to apply a frictional push to the object to move the object to a desired position and/or orientation relative to the gripper. Additionally, while a horizontally oriented surface has been depicted in the figure, vertically oriented surfaces, and/or any other appropriate surface that the object may be frictionally pushed against using a gripper may be used to apply a desired displacement to an object relative to the gripper as the disclosure is not so limited.

Figure 1C:
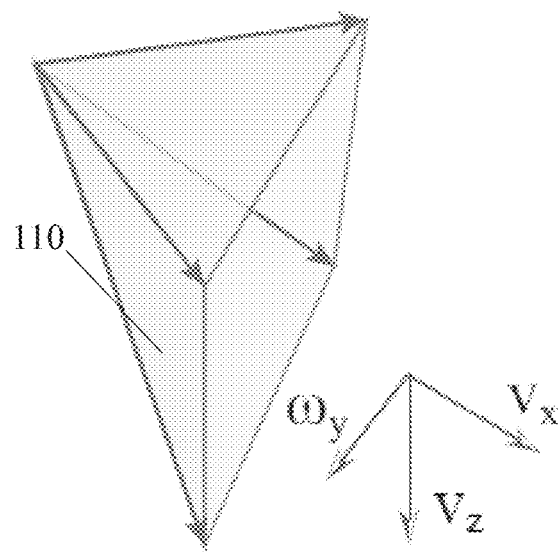
FIG. 1C is a perspective view of the motion cone of FIG. 1A.

As described previously, due to the physical constraints associated with frictional pushing, the pusher 108 is only able to move the object relative to the gripper over a limited range of directions without the pusher slipping relative to the object. This range of physically possible and stable displacements of the object relative to a gripper is depicted by the three dimensional motion cone 110 in FIGS. 1A and 1C. Thus, a relative displacement of the pusher and gripper 104 may be executed by selecting and applying one of the physically possible and stable displacements included in the motion cone 110 to the object 106 using the robotic systems described herein.

As noted previously, the range of physically possible and stable displacements from a frictional push of an object included in a motion cone may be related to a combination of factors including, for example: a mass of the object; a coefficient of friction between the pusher and the object; a coefficient of friction between the gripper contacts and the object; and gravity as indicated by arrow g in FIG. 1A. It should be noted that when the object is frictionally pushed in a direction that is not aligned with the direction of gravity the resulting motion cone may be asymmetrical. For example, as depicted in the figure, the motion cone is larger in a vertical downwards direction due to the force of gravity being added to any vertically oriented force applied to the object via the applied frictional push. Correspondingly, the physically possible and stable displacements exhibit a maximum possible vertical upwards component that is smaller than a maximum vertical downwards component due to the applied frictional force needing to overcome the force of gravity to move the object vertically upwards relative to the gripper in a direction opposite that of gravity. The specific considerations for including this effect of gravity as well as the other noted operating parameters are detailed further below.

Figure 2:
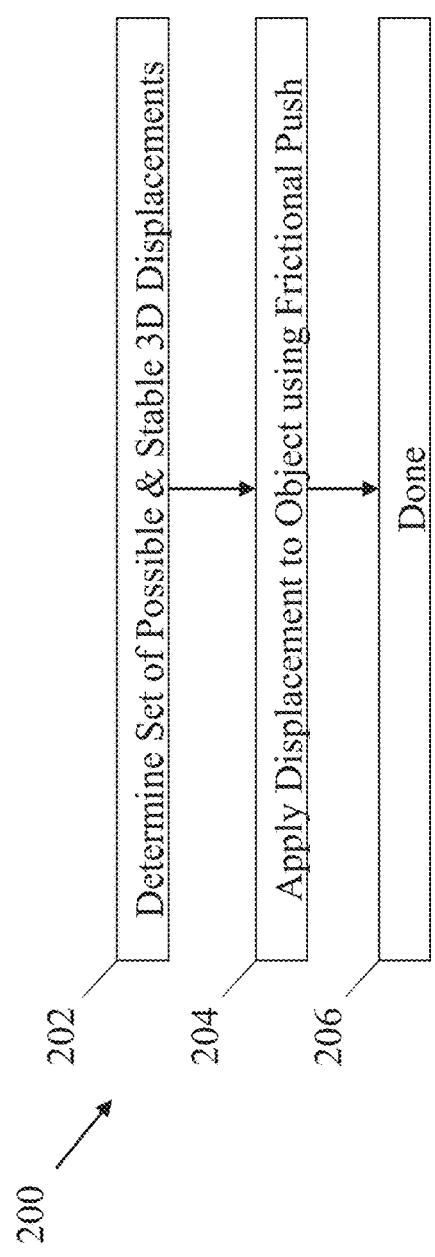
FIG. 2 is a schematic flow diagram listing a method for determining and applying a displacement to an object held in a gripper.

Referring to FIG. 2, a method 200 for manipulating an object held by a gripper may include determining a set of physically possible and stable displacements in a three-dimensional environment 202 and applying a displacement 204 to the object using a frictional push prior to finishing the movement at 206. Determining the set of displacements 202 may include determining the motion cone for a frictional push as detailed further below. Additionally, applying the displacement 204 may include selecting the displacement from the motion cone. These steps are described further below. Other possible steps may take place between determining the set of displacements and applying the displacement, as will also be discussed further below.

Figure 3:
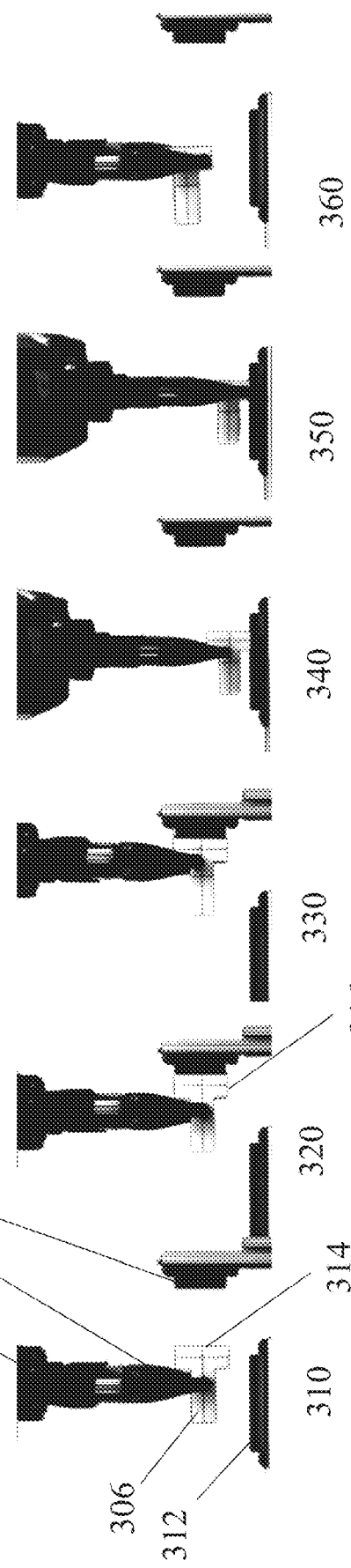
FIG. 3 is a side view showing the manipulation of an object in a gripper by applying frictional pushes using horizontal and vertical pusher surfaces.

Referring now to FIG. 3, a sequence 300 of frictional pushes and corresponding displacements are shown in frames 310, 320, 330, 340, 350 and 360. Specifically, the illustrated sequence depicts a sequence of frictional pushes applied to a block 306 held by a gripper 304 located on a distal end of a robotic arm 302. In frame 310, the gripper 304 may hold onto the block 306 in a first position and orientation with a vertical surface 314 of the block pointed away from the gripper in a horizontal direction. A frictional push may be applied to the vertical surface 314 of the block by a vertically oriented pushing surface 308 such that the block 306 slides in a horizontal direction within the grasp of the gripper 304 in frames 320 and 330 to a second position and orientation relative to the gripper. The gripper is then moved such that a horizontal surface 316 of the object that is oriented vertically downward towards the underlying pusher surface 312 is placed into contact with the underlying pusher surface at frame 340, The gripper is then moved towards the surface to apply a frictional push to the object relative to the gripper to move the object to a third position and orientation relative to the gripper at frame 350 prior to the gripper removing the object from the underlying pusher surface at frame 360. Of course, while linear displacements have been depicted in this figure, it should be understood that the frictional push may apply a translation, rotation, and/or combination of the forgoing to an object as the disclosure is not limited to a particular form of displacement.

As noted previously, motion cones may be calculated in order to determine the physically possible and stable motions of an object using a frictional push. However, the presence of an external force, (such as the gravitational forcer in the plane of motion, as well as the application of motion cones to motions not restricted to movement within a plane an object is supported may complicate how a motion cone is determined as detailed below.

Figure 5:
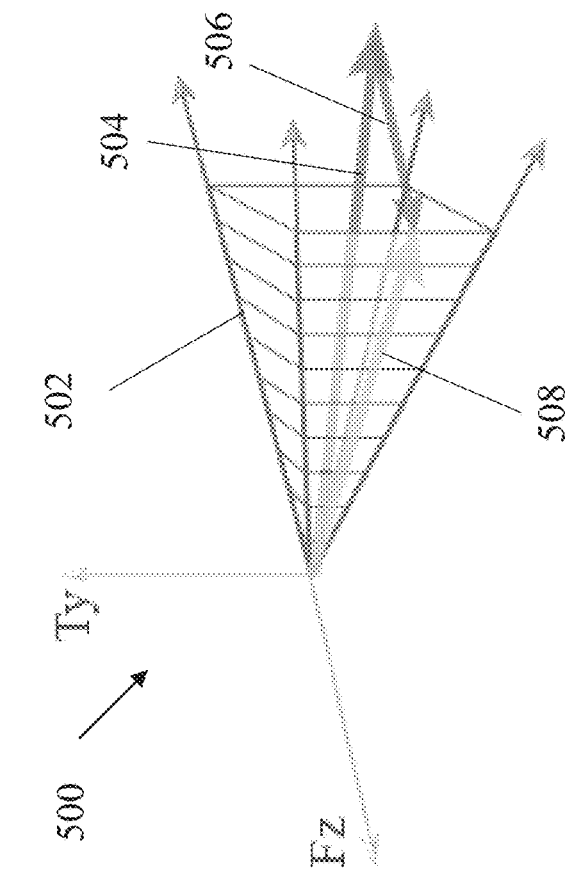
FIG. 5 is a schematic showing the gravity-free motion cone of FIG. 4 and a gripper wrench such that a net wrench applied for a frictional push falls inside/on the generalized friction cone of the pusher.
Figure 4:
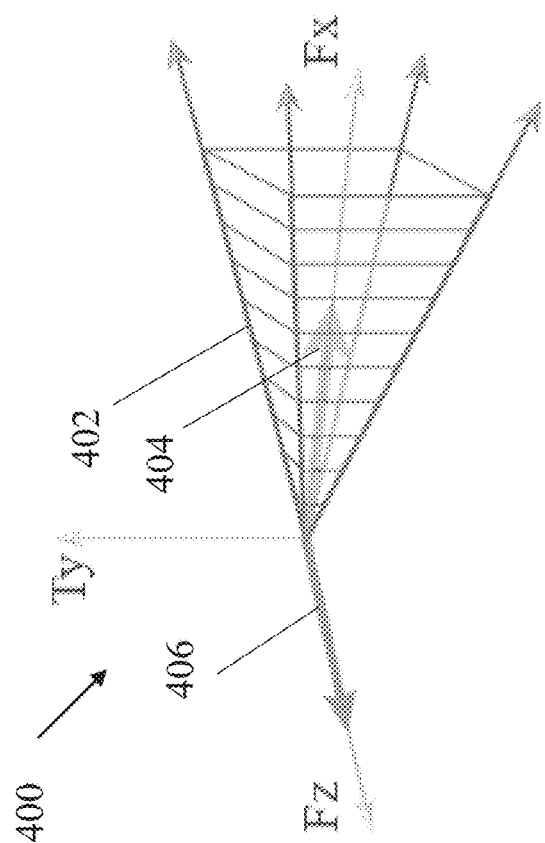
FIG. 4 is a schematic showing a gravity-free motion cone in a gravity plane.
Figure 6:
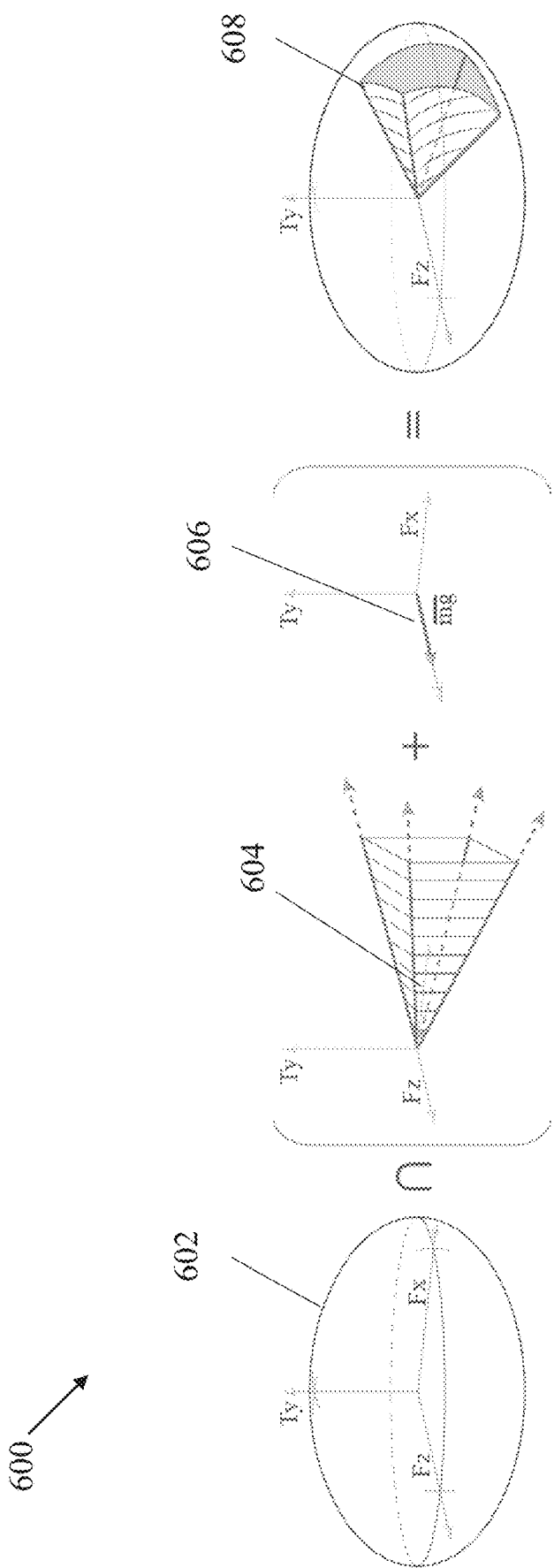
FIG. 6 is a depiction of a process for constructing a motion cone by intersection of a limit surface with a sum of the generalized friction cone of the pusher and the net gravitational and gripper wrenches to obtain a wrench set.

Referring to FIGS. 4-6, a motion cone may be calculated by combining effects of frictional contacts between an object and a gripper, as well as between the object and a pusher. A gripper wrench may be calculated based at least partly on frictional contact between the object and the gripper. A frictional cone may be calculated based at least partly on frictional contact between the object and the pusher and/or surface. Thus, a motion cone calculation may be determined based at least partly on any one of gravity, a mass of the object, a coefficient of friction between the gripper and object, a coefficient of friction between the object and a pusher, and/or a combination of any of the forgoing and other appropriate parameters.

Referring to FIG. 4, friction between a pusher and an object may result in a generalized friction cone 402, The generalized friction cone 402, along with the net gripper wrench 404 and the net gravitational wrench 406 may be calculated as a basis for the motion cone. The motion of the object may evolve following the net gripper wrench 404 acting on it. Under a quasi-static assumption, which may be appropriate for slow pushing operations, inertial forces on the object may be considered negligible, which may enable the assumption of a force balance being present in the system during frictional pushing applied during operation of a robotic system. Thus, the net gripper wrench 404, the wrench to be exerted by the pusher, and the gravitational wrench 406 may be assumed to sum to zero as elaborated on in the examples.

For stable pushing as shown in FIG. 5, a net force 508 applied by a pusher may lie inside a friction cone 502. For a given object motion to be physically possible using a stable push, the pusher may be able to provide a wrench that balances the net wrench 508 produced by the gripper wrench 504 and the gravitational wrench 506 in the plane. To know if an object motion can be achieved with a stable push, one can check if the net applied wrench falls inside the generalized friction cone 502 of the pusher.

The gravitational wrench 506 can pull the net applied wrench in or out of the generalized friction cone 502 of a pusher. For example, some of the motions in a gravity-free motion cone may not be stable pushes in the gravity plane, while for some object motions outside the gravity-free motion cone, the gravitational wrench 506 can be exploited to make them stable pushes. Referring to the above example depicted in FIG. 3 of a block 306 held in a gripper 304, without the gripper wrench 504 being scaled accordingly, the gravitational wrench 506 may result in a frictional push that is outside of the friction cone 502. However, the scaled gripper wrench 504 may move the net force 508 to within the friction cone 502. The frictional push 508, falling within the friction cone 502, may then be a physically possible and stable frictional push.

From a planning and control perspective, rather than querying if pushes may be stable pushes or not, a bound on the set of object motions possible with stable pushes may be more useful. Hence, motion cones may be calculated to demonstrate the bound on the set of possible object motions.

The motion cone may be the set of objects motions that can be produced while avoiding slipping between the object and pusher, i.e. the pusher and object may be maintained substantially stationary relative to each other. In an abstract sense, it may be considered the motion equivalent of the generalized friction cone 502 of the pusher. To calculate the motion cone, one may find the set of object motions for which the net wrench may be balanced by a wrench inside the generalized friction cone 502 of the pusher.

A method for approximating a motion cone including a set of physically possible and stable displacements, whose derivation is provided further below, is illustrate in FIG. 6 using the above described concepts. Specifically FIG. 6 depicts the use of a limit surface 602 which may be calculated to model a friction interaction between an object and a gripper. The limit surface 602 can be defined as the boundary of the set of physically possible and stable friction wrenches that a gripper can offer. In determining the limit surface 602, an ellipsoidal approximation may allow for a simpler representation of the limit surface 602, thus an ellipsoidal approximation of the limit surface may be assumed in FIG. 6. The ellipsoidal approximation has been shown to be computationally efficient for simulating and planning pushing motions. When an object slides between the contacts of two or more fingers of a gripper, a set of gripper wrenches, of which 604 is labeled, between the object and the gripper may intersect the limit surface 602. The intersection may result in a wrench set 608 from which a motion cone may be derived, as will be discussed next. The wrench set 608 may contain possible and stable gripper wrenches for frictional pushes applied to the object relative to the gripper.

Figure 7:
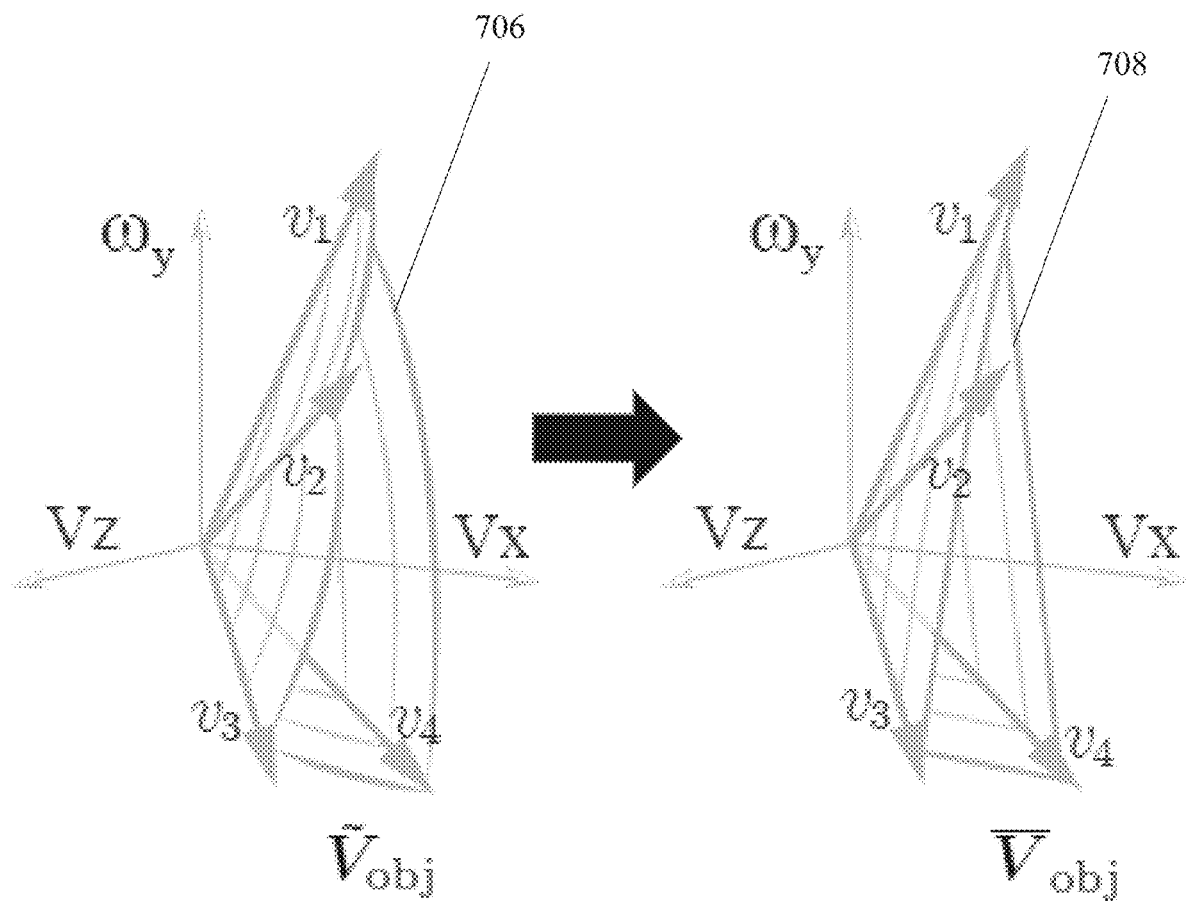
FIG. 7 is a graphical illustration for the construction of an approximated motion cone as derived from the wrench set using a polyhedral approximation.

As shown in FIG. 7, a motion cone 706 may be derived from the wrench set 608 as a set of normals to the limit surface 602 at the surface of the wrench set 608. Since the wrench set 608 may contain possible and stable gripper wrenches, the motion cone 706 may contain possible and stable motions of the object relative to the gripper which may correspond to the gripper wrenches. in a gravity-free world, a convex polyhedral motion cone could be computed resulting in a gravity-free motion cone. However, motion cones accounting for gravity are not polyhedral cones as in the gravity-free case, but rather can be best characterized as cones defined by low-curvature surfaces that intersect all in a point and pairwise in lines, such as the motion cone 706.

However, a polyhedral motion cone 708 may be approximated for ease of computation by a processing unit. For example, the low-curvature motion cone 706 may cause calculations regarding the motion cone to be computationally complex. Instead, a polyhedral approximation of the motion cone 708 may be used to approximate the surface and improve computational efficiency. Such a polyhedral approximation may be constructed by drawing a planar facet between each of the four corners of the low-curvature boundaries of the wrench set 608. Alternatively, multiple planar facets may be drawn between each of the four corners of the boundaries for finer resolution. FIG. 7 shows a polyhedral approximation 708 of a motion cone derived from the wrench set 608 of FIG. 6. Each edge of the polyhedral approximation of the motion cone 708 derived from the wrench set 608 may be an object motion corresponding to each edge of the generalized friction cone of a pusher. Of course, while certain polyhedral approximations have been applied in the currently disclosed embodiment, such as those with planar facets approximating each curved face of the cone, other appropriate types of polyhedral approximations may be used to approximate a motion cone to improve the computational efficiency of the disclosed methods. Such approximations may include, but are not limited to, those which use multiple planar facets joined together to approximate each curved face of the motion cone, thereby achieving a finer resolution.

In some instances, it may be desirable to modify the range of physically possible and stable displacements contained within the motion cone to enable a desired displacement of an object. In some embodiments, this may be done by varying a gripping force applied to an object held by a gripper by the fingers the object is grasped between. Specifically, increasing a gripping force applied to the object may increase the range of physically possible and stable displacements contained within the motion cone, while decreasing the gripping force may decrease the range of physically possible and stable displacements contained within the motion cone. Without wishing to be bound by theory, this is related to how the motion cone is determined for a particular set of operating parameters. For example, referring again to FIG. 4, for a motion inside a gravity-free motion cone, the gripper wrench direction may lie inside the generalized friction cone 402 of a pusher. Thus, a magnitude can be found with which the gripper wrench 404 direction may be scaled so that the net wrench (not shown) is inside the generalized friction cone 402. This is illustrated in FIG. 5 where any motion in the gravity-free motion cone can be made a stable motion in the gravity motion cone 502 through a combination of a gripper wrench 504 with a sufficiently large magnitude such that when it is combined with the gravity wrench 506 it produces a net wrench 508 that lies within the friction cone 502. Accordingly, by increasing a grasping force applied to an object, more of the motions contained in a gravity-free motion cone are also stable in the gravity motion cone.

In view of the above, and in reference to FIG. 1, a grasping force applied by a gripper 102 to an object 106 held by the gripper may optionally be varied between at least a first force and a second force during operation to vary the range of physically possible and stable displacements capable of being applied to the object using a frictional push. For example, the gripper 102 may exert a force on the object 106 within its grasp, and the force may increase or decrease during the application of the frictional push to vary a corresponding motion cone of the combined system. Thus, an increased grasping force may increase a range of stable motions included in the motion cone 110.

Referring again to FIG. 1, a robotic system 100 may be configured to determine the above noted motion cones 110 containing a set of physically possible and stable directions for applying a frictional push to an object 106 relative to a gripper 102 using a processing unit 114 coupled to the gripper and robot arm. In some embodiments, the robot arm may further apply the frictional push to the object 106 using one or more associated actuators 116. For example, the processing unit 114 may be configured to calculate the generalized friction cone 402, and produce the motion cone 110. The processing unit 114 may be communicatively coupled to the one or more actuators, and may direct the one or more actuators to apply a selected physically possible and stable displacement from within the set of displacements included in the motion cone to move the object 106 relative to the gripper.

It should be understood that as an object 106 is frictionally pushed while grasped in a gripper 102, a position of the finger contacts 104a within the object frame of reference may change. Consequently motion cones 110 may be computed iteratively as the object 106 moves while held by the gripper. Thus, in some embodiments, a sequence of frictional pushes and displacements may be applied to move an object from an initial position and orientation to a goal position and orientation relative to a gripper that holds the object.

Figure 8:
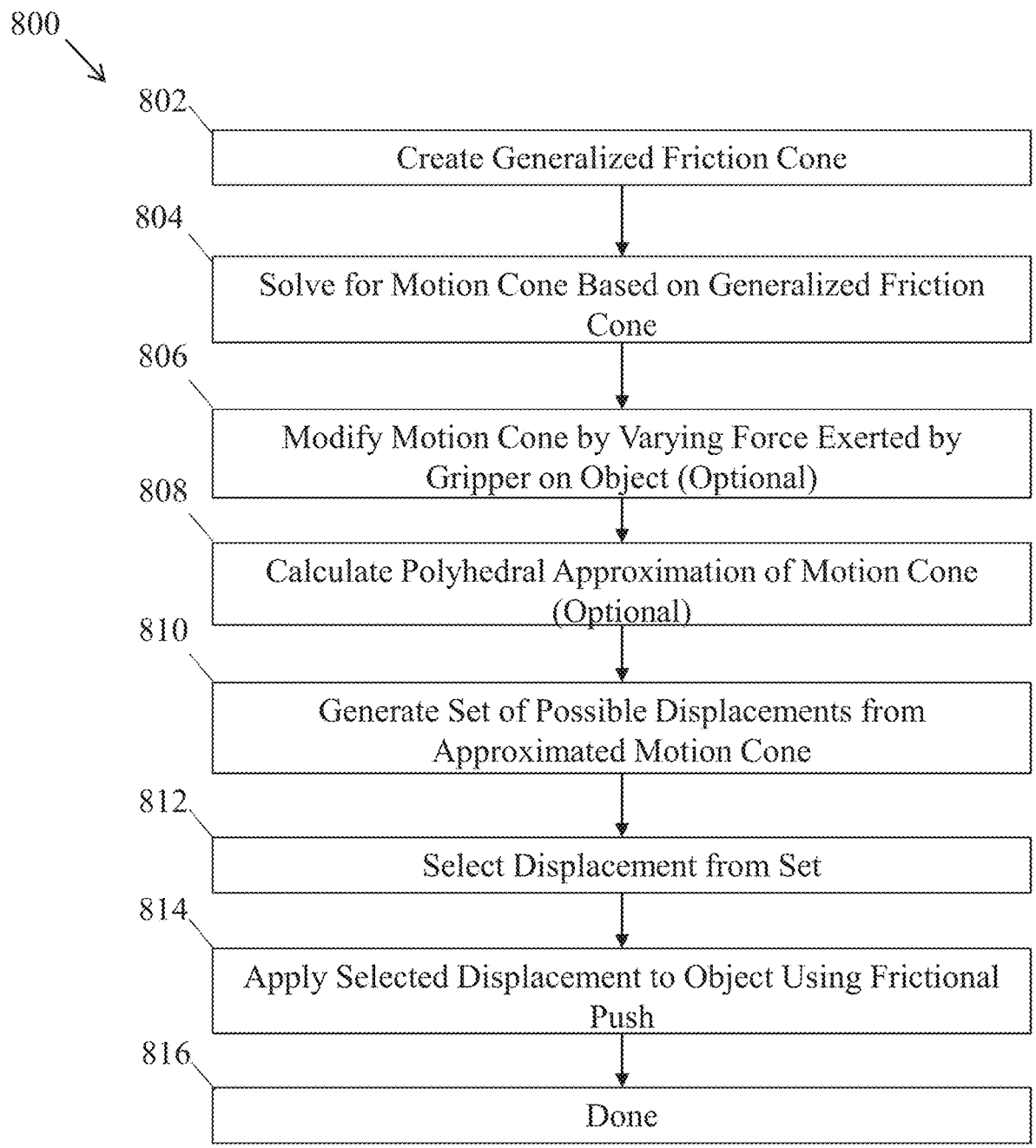
FIG. 8 is a flow diagram listing a method for generating a set of physically possible and stable displacements to be applied to an object held in a gripper using a frictional push.

Referring to FIG. 8, a method 800 for manipulating an object held by a gripper may be performed using a robotic system. The method 800 may comprise creating a generalized friction cone at 802, solving for a motion cone based on the generalized friction cone at 804, optionally modifying the motion cone by varying a force exerted by the gripper on the object at 806, optionally determining a polyhedral approximation of the motion cone at 808, optionally generating a set of physically possible and stable displacements from the approximated motion cone at 810, selecting a displacement from the set of physically possible and stable displacements at 812, and applying the selected displacement to the object using a frictional push at 814 prior to finishing the displacement at 816.

Figure 9:
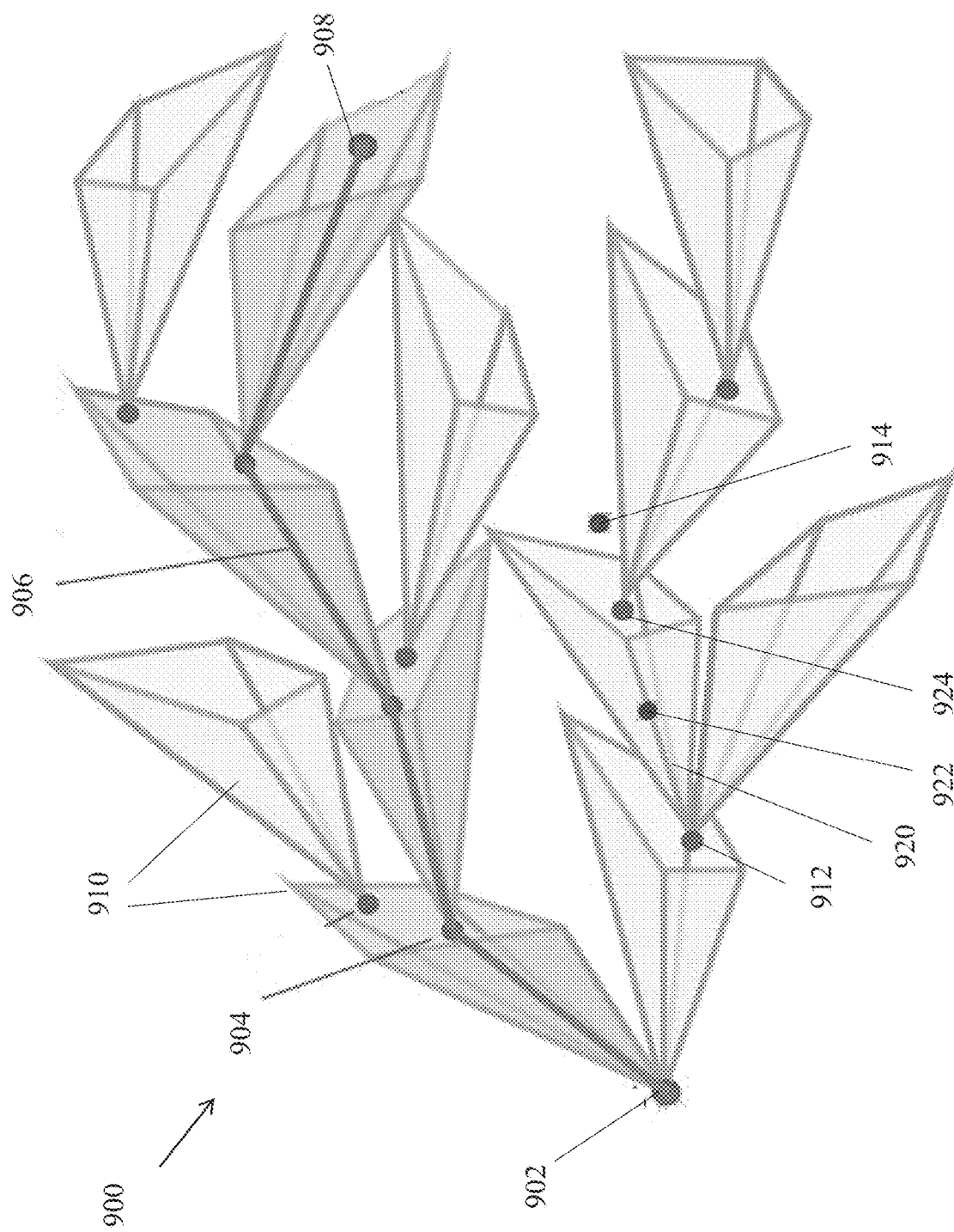
FIG. 9 shows a trajectory from an initial position and orientation to a goal position and orientation using motion cones.

Another aspect of the present application is a method for manipulating an object held by a gripper from an initial position and/or orientation to a second or goal position and/or orientation relative to the gripper. The method may comprise planning a sequence of three-dimensional displacements for applying a frictional push to the object 106 relative to the gripper. FIG. 9 shows an example of a pushing trajectory 906 planned to manipulate an object held by a gripper. The trajectory 906 may be a sequence of positions and/or orientations the object may be displaced to relative to the gripper using a frictional push. A proposed planning algorithm may obtain the trajectory 906 from an initial position and/or orientation 902 to a goal position and/or orientation 908. Specifically, a plurality of motion cones 910 originating from the initial and/or one or more intermediate positions 904 may be used for planning in-hand manipulations of the object grasped by a gripper using frictional pushes. The motion cones may be calculated at one, a portion, and/or all of the possible intermediate positions and/or orientations 904 within a trajectory 906 for planning purposes as detailed further below.

In one embodiment, a planning framework used to determine a trajectory may utilize a Transition Based Rapidly Exploring Random Tree (T-RRT*)-based architecture which may sample possible positions and/or orientations of an object held by a gripper. T-RRT* is one possible optimal sampling based method developed for planning on space cost-maps. Alternatively, the framework may be any other suitable method for planning the sequence of frictional pushes. In such an embodiment, a rejection check may be implemented to evaluate if a sampled position and/or orientation, such as position, 914 can be reached using a possible frictional push. Alternatively, the framework may be implemented without the rejection check. Within the example, the framework may grow a tree 900 towards the sampled position and/or orientation 914 as best as possible. For example, a parent node 912 may already be contained in the tree 900. Thus, the tree 900 may grow towards the sampled position and/or orientation 914 using a motion cone 920 extending from the parent node 912. nearest to the sampled position and/or orientation 914.

In the above embodiment, a high-level planning framework may be based, for example, on T-RRT*. T-RRT* framework may rely on a transition test which may filter the sampled positions and orientations to prefer exploration in low space-cost regions for selective exploration. For example, a predetermined space cost threshold may be set and used as a filter. The predetermined space cost threshold may be defined as a distance from a current position and/or orientation to the goal position and/or orientation 908. The transition test may constrain stochastic exploration towards the goal position and/or orientation 908, while allowing flexibility to explore high-cost transitions if they should be desirable to get an object to the goal position and/or orientation 908. For example, despite not necessarily leading to the goal position and/or orientation 908 in hindsight, the tree 900 may grow towards the sampled position and/or orientation 914 because at the time it may possibly provide an optimal path towards the goal position and/or orientation 908. However, ultimately a final trajectory 906 may not include the sampled position and/or orientation 914.

Sampled positions or orientations 904 are depicted as lying within motion cones 910. However, this is merely exemplary and sampled positions or orientations 904 may also lie outside of any motion cones 910 regardless of whether they have been generated or are even within the predetermined space cost threshold.

An underlying RRT* framework may be used to make and rewire connection in the tree 900 at every position and/or orientation in the tree 900 such that a space cost of the nodes may be reduced when possible. The space cost of a node may be defined as a sum of the space cost of the parent node and a space cost of a frictional push to reach the sampled node from the parent node. As a non-limiting example, the space cost of a frictional push may be 0.1 if the parent node were to use a same pusher as the child, and may be 1 otherwise. Using a node space cost definition such as in the described example, the planner may generate pushing sequences that prefer fewer changes between pushers such as the pusher 108 and surface 112 depicted in FIG. 1 when pushing the object towards the goal position and orientation. However, any suitable node space cost definition may be used with the framework or other suitable frameworks may be employed as the disclosure is not so limited.

An example of an algorithm for use in the planner may be as follows. For each of the sequence of displacements, a set of physically possible displacements for moving the object relative to the gripper may be determined given its position at that point in the sequence, as well as any other positions along the sequence. For example, the planner may initiate a tree 900 with an initial position and orientation 902 and a goal position and orientation 908 of an object in a gripper, and may generate motion cones 910 at the initial position and/or orientation 902.

While the goal position and/or orientation 908 may not be reached within the predetermined cost threshold, a random position and/or orientation 914 may be sampled. A nearest parent position and/or orientation 912 in the tree 900 may be found and a unit-step position and/or orientation 922 towards the sample may be computed. A transition test may be applied, during which the planner may evaluate if the unit step position and/or orientation 922 is beneficial or not. If it is beneficial, a new object position and/or orientation 924 closest to the sample position and/or orientation 914 that may be reached using the motion cone at the parent position and/or orientation 912 in the tree 900 may be computed. The object position and/or orientation 924 closest to the sample position and/or orientation 914 may be checked against the motion cone 920. This computation may be done using motion cones at the parent node 912. For example, the sample position and/or orientation 914 may be within the motion cone 920 and may be the new object position and/or orientation 924. However, an intermediate position and/or orientation within the motion cone 920 and close to the sampled position and/or orientation 914 may be computed as the new position and/or orientation 924 instead.

If a frictional push applied from a parent node position and/or orientation 912 to a sampled position and/or orientation 914 is already inside any of the computed motion cones, the sampled position and/or orientation 914 may be directly reached. If the frictional push is outside all calculated motion cones, a frictional push that is inside one of the motion cones and closest to the desired frictional push may be selected. For example, in FIG. 9 the sampled position and/or orientation 914 is outside of the motion cone 912. However, the closest object position and/or orientation 924 is within the motion cone and may be selected.

In some embodiments, it may further be checked if moving towards a new computed position and/or orientation, such as 924, is beneficial and/or if the new position and/or orientation is one at which the gripper is capable of maintaining a grasp of the object. The new position and/or orientation 924 may be added to the tree 900 such that a localized space cost of the new position and/or orientation 924 and the nodes nearby are lowered if possible, in some embodiments, motion cones 910 may be generated for a portion, and optionally each, new node added to the tree 900. As shown in FIG. 9, motion cones such as motion cone 920 may be generated but abandoned if the trajectory 900 is changed to a different direction. For example, motion cone 920 is shown as generated but not part of the final trajectory 906. Further, in instances where multiple pushers are used that are capable of applying frictional pushes to an object in multiple directions, a plurality of motion cones may be determined for the one or more nodes corresponding to intermediate positions in a displacement sequence. For example, node 912 has two motion cones 920 that extend outward from the node.

After determining a desired sequence of displacements, as illustrated by the final trajectory 906, the sequence of displacements may be executed using either one, or a plurality of, frictional pushes to displace an object from an initial position and orientation 902 to a goal position and orientation 908 relative to a gripper the object is held by. For example, the sequence may comprise one or more displacements applied to the object using a sequence of frictional pushes to move the object from the initial position and orientation 902 to one or more intermediate positions and orientations 904 and finally the goal position and orientation 908. It should be understood that any number of displacements may be utilized between the initial 902 and goal 908 positions and orientations.

Figure 10:
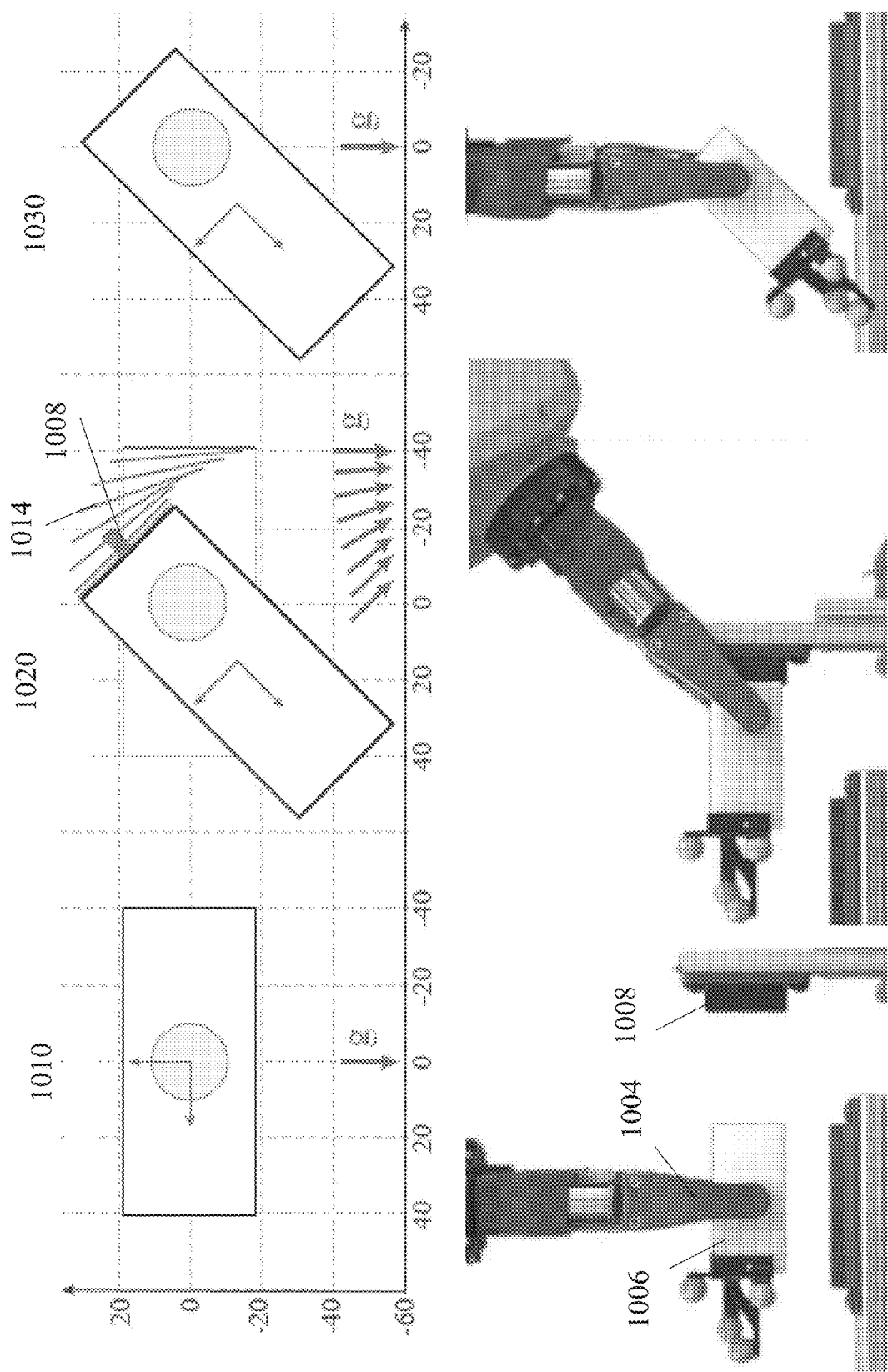
FIG. 10 depicts a sequence of frictional pushes which alter a position and orientation of an object held by a gripper.
Figure 11:
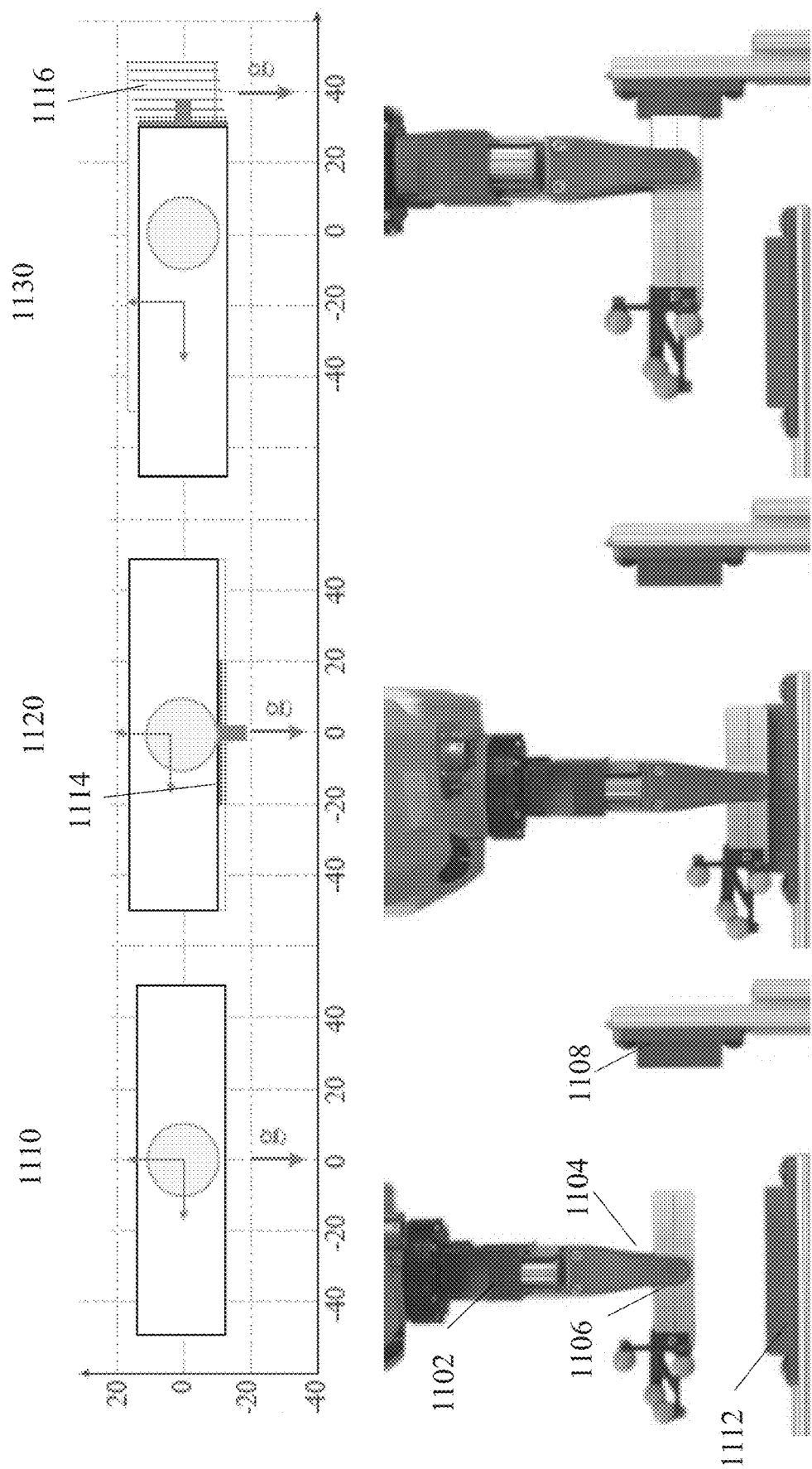
FIG. 11 depicts a sequence of frictional pushes which alter only a position of an object held by a gripper.
Figure 12:
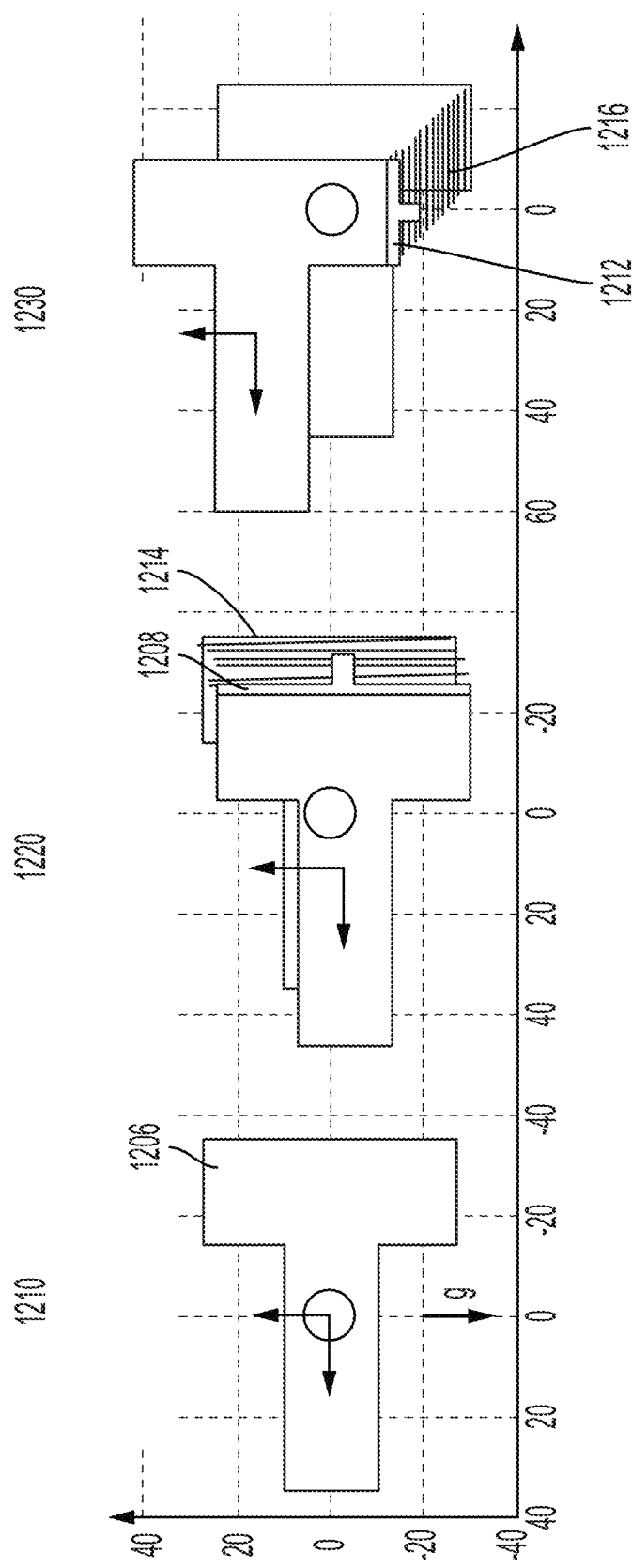
FIG. 12 depicts a sequence of frictional pushes applied by multiple pushers and/or surfaces to an object held by a gripper.

Referring to FIGS. 10-12, example trajectories are presented to demonstrate the disclosed methods, These examples are non-limiting and are merely intended to demonstrate some aspects of the presented method. FIG. 10 shows a trajectory as a sequence of frames 1010, 1020 and 1030 during which the position and orientation of an object 1006 held by a gripper 1004 may be adjusted using frictional pushes 1014. In this example, a single pusher 1008 may be used for each of the frictional pushes 1014. The object 1006 may have an initial position and/or orientation in frame 1010 where the object is horizontal and grasped towards a central region of the object and a goal position and/or orientation in frame 1030 where the object is angled relative to the gripper and held towards an end of the object. The frictional pushes 1014 may be applied in frame 1020 to achieve the goal position and/or orientation based on the initial position and/or orientation.

FIG. 11 shows a trajectory as a sequence of frames 1110, 1120 and 1130 during which only the position of an object 1106 held by a gripper 1104 may be adjusted using frictional pushes 1114 and 1116. In this example, both a surface 1112 and a vertically oriented pusher 1108 may apply frictional pushes to the object. The surface 1112 may apply first frictional pushes 1114 to move the object vertically upwards within the gripper and the pusher 1108 may apply second frictional pushes 1116 to move the gripper towards an end of the object. Thus, the object 1106 may have an initial position and/or orientation in frame 1110 and a goal position and/or orientation in frame 1130. The first frictional pushes 1114 may be applied by the surface 1112 in frame 1120, and the second frictional pushes may be applied by the pusher 1108 in frame 1130 to achieve the goal position and/or orientation.

FIG. 12 shows a trajectory as a sequence of frames 1210, 1220 and 1230 during which the position and orientation of an object 1206 held by a gripper may be adjusted using frictional pushes 1214 and 1216. In this example, a first pusher 1208 and a second pusher 1212 may be used to apply first frictional pushes 1214 to move the object vertically down and towards the left relative to the gripper and second frictional pushes 1216 to move the object upwards relative to the gripper, respectively. The object 1206 may have an initial position and/or orientation in frame 1210 and a goal position and/or orientation in frame 1230. The first frictional pushes 1214 may be applied by the first pusher 1208 in frame 1220. The second frictional pushes 1216 may be applied by the second pusher 1212 in frame 1230 to achieve the goal position and/or orientation.

Figure 13:
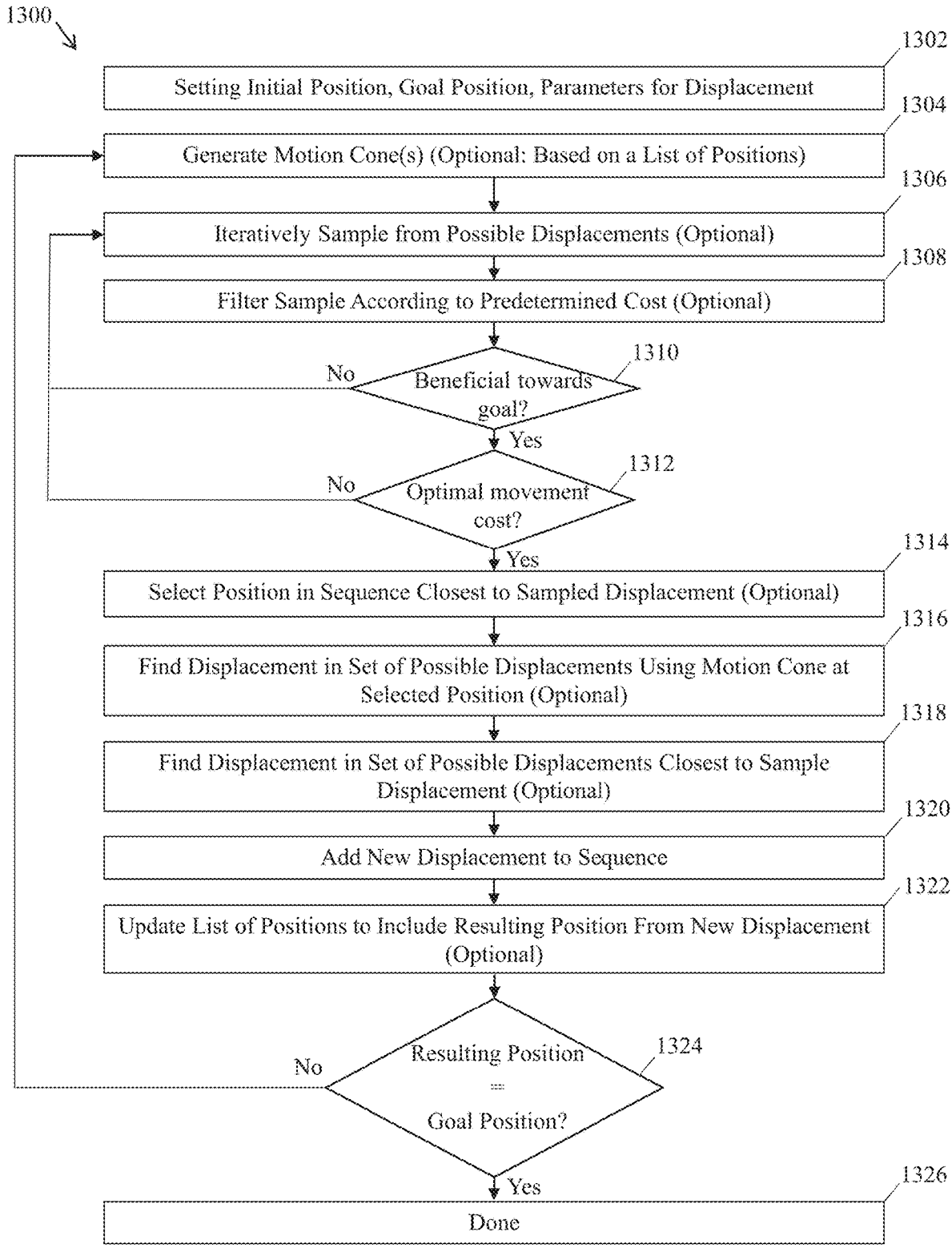
FIG. 13 is a flow diagram listing a method for sampling from displacements of an object held in a gripper at a first position such that they may be added to a sequence leading to a goal position.

Referring to FIG. 13, a method 1300 for manipulating an object held a gripper may comprise setting an initial position and/or orientation, a goal position and/or orientation, parameters for the displacements to be calculated and other suitable preparations as described herein for applying motion cones for controlling movement of an object relative to a gripper at 1302. The method may further comprise generating motion cones, optionally based on a list or tree of positions and/or orientations at 1304. The method may further comprise the option of iteratively sampling from possible displacements to be applied to the object at 1306. In some embodiments, the samples may be filtered according to a predetermined cost threshold such as a predetermined space cost threshold at 1308. The filtered samples may then be checked to see whether or not they are beneficial in moving the object towards the goal position and/or orientation at 1310 and whether the samples constitute an optimal movement cost at 1312. The method may further comprise optionally selecting a position in the sequence closest to the sample displacement at 1314. The method may also include optionally finding a displacement in the set of possible displacements using a motion cone generated at the selected position at 1316, In instances where the sampled displacement is outside of a set of possible displacements, a displacement in the set of possible displacements closest to the sample displacement may be selected at 1318. After selecting the displacement, a new displacement corresponding to the selected displacement may be added to the sequence at 1320. At 1322, the list or tree of positions and/or orientations may be updated to include a resulting position from the new displacement. This process may be iterated until a suitable trajectory to the goal position and orientation is determined. Thus, the resulting object position may be checked to determine whether the goal position and orientation has been reached with the new displacement at 1324. If the goal position and/or orientation has not been reached, further displacements may be iteratively sampled and/or filtered. Otherwise, the planning process may be ended at 1326 and the resulting trajectory corresponding to a sequence of displacements applied using frictional pushes may be executed as described previously.

What follows are example procedures with included calculations that may be used in accordance with some embodiments of the methods and/or systems set forth in the present disclosure. The calculations described here are non-limiting, as any suitable calculations may be used. Therefore, the presented calculations are intended to demonstrate only one possible procedure for implementing the disclosed systems and methods.

The following procedure may be used to construct a limit surface for contact between an object and gripper in one embodiment. Let $w=[f_x,f_z,m_y]$ be a frictional wrench on the object from the gripper in the contact frame. A mathematical representation of the ellipsoidal limit surface may be given by $w^T A w = 1$, where $A = \text{Diag}(a_1^{-2}, a_2^{-2}, a_3^{-2})$. For isotropic friction, the maximum friction force is, $a_1 = a_2 = \mu_c N$, where $\mu_c$ is the friction coefficient between the contact and the object and N is the normal force at the contact. The maximum friction torque about the contact normal is $a_3 = rc\mu_c N$, where r is the radius of the contact and $c \in [0,1]$ an integration constant. For a uniform pressure distribution at the gripper contact, c is about 0.6.

When the object slides in the gripper, the friction wrench between the object and the gripper contact ($w_c$) intersects the limit surface. Based on the maximal energy dissipation principle, the normal to the limit surface at the intersection point provides the direction of the twist of the object at the gripper contact. Conversely, if the object twist ($v_{obj} = [v_x, v_z, \omega_y]^T$) is known, the friction wrench following can be found as, $$w_c = \frac{A^{-1} v_{obj\_c}}{\sqrt{v_{obj\_c}^T A^{-1} v_{obj\_c}}} = \mu_c N \bar{w}_c \tag{1}$$

Here, $v_{obj\_c}$ is the velocity of the object in the gripper contact frame and can be computed from $v_{obj}$ as $v_{obj\_c} = \tilde{J}_c \cdot v_{obj}$. The jacobian ($\tilde{J}_c$) maps the object velocity from the object frame to the gripper frame. $\bar{w}_c = [\bar{f}_x, \bar{f}_z, \bar{m}_y]^T$ is the unit wrench lying on a limit surface that is scaled by maximum linear friction available at gripper contact ($\mu_c N$) to produce the net frictional wrench.

Under the ellipsoidal limit surface model assumption, translational velocity $[v_{x\_c}, v_{z\_c}]^T$ the object in the gripper contact frame may always be parallel and opposite to the linear frictional $[\bar{f}_x, \bar{f}_z]^T$ applied by the gripper contact in the gripper contact frame. Moreover, the relationship between the friction wrench and the normal to the limit surface, which defines the motion direction, may set the following constraint between the angular velocity at the gripper contact and the linear velocity:

$$\frac{v_{x\_c}}{\omega_{y\_c}} = (rc)^2 \frac{\bar{f}_x}{\bar{m}_y} \text{ and } \frac{v_{z\_c}}{\omega_{y\_c}} = (rc)^2 \frac{\bar{f}_z}{\bar{m}_y}$$

Given the friction wrench on the object from the gripper, the object velocity can be found as:

$$v_{obj} = b J_c B \cdot \bar{w}_c, \; B = \text{Diag}(1,1,(rc)^{-2}), \; b \in \mathbb{R}^+ \tag{2}$$

Here, $J_c$ maps the object velocity from the gripper frame to the object frame.

The following procedure may be used to calculate a generalized friction cone in accordance with some embodiments. The friction between the pusher and the object can be modelled with the Coulomb friction law. The concept of generalized friction cone (W) as a representation of the local friction cone at a pusher contact in the object frame has been introduced. The generalized friction cone for a pusher modelled with multiple point contacts is the convex hull of the generalized friction cones for each constituent pusher contact.

$$W_{pusher} = \{\overline{w}_{pusher} = G_p \tilde{f}_p | \tilde{f}_p \in FC_{pusher}\} \quad (3)$$

Here, $G_p$ is the jacobian that maps the local pusher contact forces ($f_p$) at the pusher to the object frame, $\overline{w}_{pusher}$ is the unit wrench corresponding to unit force/s $\tilde{f}_p$ inside the friction cone(s) at the pusher constituent contact(s).

Now, with the approaches for pusher contact modelling set, the mechanics of pushing in a plane are formulated.

The following description of frictional pushing may be used in combination with the above calculated limit surface and generalized friction cone in accordance with some embodiments. The motion of the object in the plane of motion evolves following the net wrench acting on it. Under the quasi-static assumption, which is appropriate for slow pushing operations, the inertial forces on the object are negligible and there is force balance:

$$w_{support} + w_{pusher} + mg = 0 \quad (4)$$

Here, (4) is written in the object frame located at the center of gravity. $W_{gripper}$ is the friction wrench provided by the gripper, $w_{pusher}$ is the wrench exerted by the pusher, m is the mass of the object, g is the gravitational component in the plane of motion. $G_c$ ($G_c = J_c^T$) is the jacobian that maps the gripper wrench from the gripper contact frame (usually located at the center of pressure) of the gripper surface to the object frame. So, $w_{gripper} = G_c \cdot w_c$ and (4) becomes:

$$\mu_c N G_c \cdot \overline{w}_c + G_p \cdot f_p + mg = 0 \quad (5)$$

For stable pushing, force at the pusher lies inside the friction cone in the local pusher contact frame. For a general planar case, such a condition for a stable push can be written as:

$$\mu_c N G_c \cdot \overline{w}_c + G_p \cdot f_p + mg = 0, f_p \in FC_{pusher}$$

For a given object motion to be possible with a stable push, the pusher may be able to provide a wrench that balances the net wrench produced by the friction wrench from the gripper and the gravitational force in the plane. Using (3) the previous equation can be rewritten as:

$$-\mu_c N G_c \cdot \overline{w}_c - mg = k\overline{w}_{pusher}, \overline{w}_{pusher} \in W_{pusher}, k \in \mathbb{R}^+ \quad (6)$$

Here, k is the magnitude of the pusher force. To know if an object motion can be achieved with a stable push, one can check if the net wrench falls inside the generalized friction cone of the pusher.

$$-\mu_c N G_c \cdot \overline{w}_c - mg \in W_{pusher} \quad (7)$$

The following procedure may be used to calculate a motion cone in accordance in some embodiments. The motion cone is the set of object motions that can be produced while keeping the pusher contact sticking. In an abstract sense, it is the motion equivalent of the generalized friction cone of the pusher.

In view of the above, it is desirable to find the set of object motions for which the net wrench can be balanced by a wrench inside the generalized friction cone of the pusher. This is equivalent to finding a set of object motion for which constraint (6) holds true. Rewriting, $$-\mu_c N G_c \cdot \overline{w}_c - mg = k\overline{w}_{pusher}, \overline{w}_{pusher} \in W_{pusher}, \quad (8)$$

$$k \in \mathbb{R}^+ G_c \cdot \overline{w}_c = \frac{k}{-\mu_c N} \overline{w}_{pusher} + \frac{m}{-\mu_c N} g \, \overline{w}_{pusher} \in W_{pusher},$$

$$k \in \mathbb{R}^+$$

Using (2) the gripper wrench $\overline{w}_c$ can be mapped to the object velocity $v_{obj}$. Hence, to find a motion cone, the set of gripper wrenches ($\overline{w}_c$) that satisfy (8) is first found and then this wrench-set ($\tilde{W}_c$) is mapped to the set of object twists. This object twist-set, i.e. the motion cone, is denoted by $\tilde{V}_{obj}$.

The presence of an external force, (such as the gravitational force) other than the pusher force, in the plane of motion complicates the mechanics and the structure of the motion cone. To explain this effect in detail, the case of pushing an object on a horizontal surface where there is no such additional force is first considered.

The following procedure may demonstrate conversion between calculations of motion cones in two dimensions to three dimensions in accordance with some embodiments of the present method and/or system. For the case of pushing on a horizontal plane, g=0. For an object on a flat surface with uniform pressure distribution on the surface, the surface contact frame coincides with the object frame, which makes $J_c, \tilde{J}_c$, and $G_c$ identity matrices. Then, (6) can be written as:

$$-\mu_c N \overline{w}_c = k\overline{w}_{pusher}, \overline{w}_{pusher} \in W_{pusher}, \quad (9)$$

$$k \in \mathbb{R}^+ \, \overline{w}_c = \frac{-k\overline{w}_{pusher}}{\mu_c N}, \overline{w}_{pusher} \in W_{pusher}$$

The set of valid gripper wrenches is the negative of the generalized friction cone of the pusher, i.e, $\tilde{W}_c = -W_{pusher}$. By mapping $\tilde{W}_c$ through (2), the motion cone $\tilde{V}_{obj}$ is found.

Note that for the case of pushing on a horizontal surface, $\tilde{W}_c$ and $\tilde{V}_{obj}$ are convex polyhedral cones. Moreover, they are independent of the gripper normal force, i.e, the weight of the object (mg), and friction at the gripper surface ($\mu_c$).

For a more general pushing tasks however, g≠0. From (8) it is seen that, unlike for horizontal pushing, the system parameter ($\mu_c$) and force magnitudes (k and N) influence the direction vectors of the wrench-set $\tilde{W}_c$.

The next example focuses on pushing an object in a parallel jaw grasp in the plane of gravity. There the gravitational force is not zero in the plane of motion and the jacobians $J_c$, $\tilde{J}_c$, and $G_c$ are not always identity matrices as the gripper (finger) contact location changes in the object frame as the object is pushed in the grasp. This is the same as the previous case except the jacobians $J_c$, $\tilde{J}_c$, and $G_c$ are always identity matrices. The case is same as the previous case except that only a part of the gravitational force acts in the plane of motion and not all of the gravitational force as in the previous case.

For a case similar to the previous case, but in a gravity-free world, the simplification of (8) can be exploited and a convex polyhedral motion cone can be computed similar to that in the horizontal pushing case, but while taking the non-identity jacobians $J_c$, $\tilde{J}_c$, and $G_c$ into consideration. This motion cone is referred to as a gravity-free motion cone in the later discussions.

From (7) it can be seen that the gravitational wrench (mg) on the object can pull the net wrench in or out of the generalized friction cone of the pusher. Some of the motions in the gravity-free motion cone may not be stable pushes in the gravity plane, while for some object motions outside the gravity-free motion cone, the gravitational force on the object can be exploited to make them stable pushes.

The following procedure may be used to vary a force of the gripper on the object to modify the motion cone, and may be used in accordance with some embodiments of the present method and/or system. Any push inside the gravity-free motion cone can also be made a stable push in the gravity plane by increasing the grasping force above a minimum force threshold. For a motion inside a gravity-free motion cone, the gripper/grasp wrench direction lies inside the generalized friction cone of the pusher, i.e., $G_c \cdot \overline{w}_c \in W_{pusher}$. A magnitude ($\mu_c N$) can always be found with which the gripper/grasp wrench direction may be scaled so that the net wrench (the vector sum of the gravitation wrench and the gripper/grasp wrench) is just inside the generalized friction cone of the pusher. For a given $\mu_c$, the bounds on N applied to pull the net wrench inside the generalized friction cone of the pusher can be analytically found.

The following procedure may be used to find an object motion cone accounting for gravity for a given grasping force and friction parameters in accordance with some embodiments.

Rewriting (8), $$G_c \cdot \overline{w}_c = \frac{k}{-\mu_c N} \overline{w}_{pusher} + \frac{m}{-\mu_c N} g \; \overline{w}_{pusher} \in W_{pusher}, k \in \mathbb{R}^+ \quad (10)$$

For a known $\overline{w}_{pusher} \in W_{pusher}$, (10) is a set of three linear equalities with 4 unknowns, $\overline{w}_c \in \mathbb{R}^3$ and k. However, it is known that $\overline{w}_c = [\bar{f}_x, \bar{f}_z, \overline{m}_y]^T$ is a unit wrench that satisfies the ellipsoidal limit surface constraint:

$$\frac{\bar{f}_x}{1} + \frac{\bar{f}_z}{1} + \frac{\overline{m}_y}{(rc)^2} = 1 \quad (11)$$

Constraints (10) and (11) can be solved together analytically to find $w_c$ and k. Specifically, after substituting $f_{x,z}$ and $m_y$ from (10) into (11), (11) becomes a quadratic equation in k. Solving this quadratic equation for $k \in \mathbb{R}^+$ gives a unique solution for k. Substituting this value for k in (10) makes (10) a set of three linear equalities with three unknowns $[\bar{f}_x, \bar{f}_z, \overline{m}_y]$ which can be solved for a unique solution.

For prehensile pushing in the gravity plane, the relationship between $\overline{W}_c$ and $W_{pusher}$ is not linear as in the gravity-free case. To find wrench-set $\overline{W}_c$, $w_{pusher}$ may be swept over the boundary of $W_{pusher}$ and solve (10) and (11) iteratively.

$\tilde{W}_c$ and $\tilde{V}_{obj}$ are not polyhedral cones as in the gravity-free case, but rather can be best characterized as cones defined by low-curvature surfaces that intersect all in a point and pairwise in lines.

The following procedure may be used to compute a polyhedral approximation of the motion cone in accordance with some embodiments of the present method and/or system. As an object is pushed in a grasp, the position of gripper contacts in the object frame change, and consequently $G_c$ and the motion cone $\tilde{V}_{obj}$ also change. The motion cone may thus be computed iteratively as the object moves in the grasp.

As the boundary surfaces of the motion cone have low curvatures, a polyhedral approximation ($\overline{V}_{obj}$) of the motion cone is proposed for its efficient computation. Each edge of the polyhedral approximation of the motion cone is the object motion corresponding to each edge of the generalized friction cone of the pusher. The procedure may be as follows:

1. Solve (10) and (11) simultaneously to get $\overline{w}_c$ for $\overline{w}_{pusher}$ corresponding to the edges of $W_{pusher}$.
2. Define the set of $\overline{w}_c$ computed in step 1 as the generators/edges of the gripper/grasp wrench-cone $\overline{W}_c$.
3. Map $\overline{W}_c$ to the object twist space using (2) to get the polyhedral approximation $\overline{V}_{obj}$ of the motion cone.

An example of robust in-hand manipulation via motion cones is presented as follows. Constraining the planning tree to propagate through the interior of motion cones may increase robustness. The structure of motion cones may be exploited to derive manipulation strategies that may be robust against uncertainties in the friction parameters at the finger and pusher contacts, grasping force, and even mass of the object.

For a given object mass, given friction at the finger contacts, and given grasping force, the motion cone may be a function of the friction at the pusher. For a higher friction coefficient, the generalized friction cone may be wider and so may be the motion cone. There may be a monotonic relationship between the friction at the pusher and the volume of the motion cone. This relationship can be exploited to derive pushing strategies robust to uncertainty in the friction at the pusher.

Proposition 1. Any object velocity inside the motion cone for a given pusher friction coefficient is inside the motion cone for a higher friction coefficient at the pusher.

Proof. Let $W_{pusher}$ be the generalized friction cone of a pusher and let $W^+_{pusher}$ be the generalized friction cone for the same pusher but with a higher coefficient of friction. From the definition of the generalized friction cone, it is a linear mapping of the Coulomb friction cone(s) at the constituent contact(s).

$$W_{pusher} \subset W_{pusher}^+ \quad (12)$$

If an object motion is inside the motion cone, the net required wrench for the object motion lies inside the generalized friction cone of the pusher:

$$-\mu_s N J_s^T \cdot \overline{w}_s - mg \in W_{pusher} \quad (13)$$

From (12) and (13), $$-\mu_s N J_s^T \cdot \overline{w}_s - mg \in W_{pusher}^+ \quad (14)$$

Since the net wrench lies inside the friction cone of the pusher, the object motion is inside the motion cone.

If there is uncertainty in the friction coefficient at the pusher, a robust strategy may be obtained by planning with the lower bound on the coefficient. The resulting strategy may produce the same net object motion in the grasp even if the true friction coefficient at the pusher is higher.

For a given friction coefficient at the pusher, the motion cone is a function of the object mass and the friction coefficient at the finger contacts, and the grasping force.

Unlike the monotonic relationship of the motion cone to the friction at the pusher, the dependence of the motion cone on the friction force at the fingers is not straight-forward. For increased friction at the fingers, either by increasing the grasping force or by increasing the coefficient of friction, a wider motion cone may or may not result. Instead the motion cone shifts towards the gravity-free motion cone. Therefore, some of the object motions inside the motion cone, particularly those that are feasible by exploiting gravity, may no longer be feasible.

One approach to address this problem and to achieve robust pushing strategies under the uncertainty in the friction at the fingers is as follows. In this approach, a subset of a motion cone may be found such that any object motion inside the subset will always be feasible with any friction at the gripper that is higher than expected.

Proposition 2. Any motion inside the intersection of the gravity-free motion cone and the motion cone, for a given friction at the gripper, is inside the motion cone for a higher friction at the fingers or/and a higher grasping force:

Proof. If an object motion is inside the motion cone, from (13), the net wrench is inside the generalized friction cone of the pusher:

$$-\mu_s N J_s{}^T \overline{w}_w - mg \in W_{pusher}. \quad (15)$$

If the object motion is inside the gravity-free motion cone:

$$-\mu_s N J_s{}^T \overline{w}_s \in W_{pusher}$$

or simply, $$-J_s{}^T \overline{w}_s \in W_{pusher} \quad (16)$$

Let $-\|_s{}^+$ be a higher friction coefficient at the fingers and $N^+$ be a higher grasping force. The net wrench required for the same object motion under the higher finger friction conditions is:

$$-\mu_s{}^+ N^{+J}{}_s{}^T \overline{w}_s - mg.$$

$$-k J_s{}^T \overline{w}_s - \mu_s N J_s{}^T \overline{w}_s - mg, \, k \in \mathbb{R}^+, \quad (17)$$

From (15), (16), and (17):

$$-k J_s{}^T \overline{w}_s - \mu_s N J_s{}^T \overline{w}_s - mg \in W_{pusher}$$

Since the net wrench lies inside the friction cone of the pusher, the object motion is inside the motion cone.

In case of uncertainty in the friction at the gripper, to generate robust pushing strategies, the planner may be constrained to the intersection motion cones computed with lower bounds on the friction coefficients and the gasping force. Such a pushing strategy may produce the same regrasp outcome for the expected variation in the friction at the gripper.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments, Also, the embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention. All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computing device may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone, tablet, or any other suitable portable or fixed electronic device.

Also, a computing device may have one or more input and output devices. These devices can be used, among other things, to present a user interface. Examples of output devices that can be used to provide a user interface include display screens for visual presentation of output and speakers or other sound generating devices for audible presentation of output. Examples of input devices that can be used for a user interface include keyboards, individual buttons, and pointing devices, such as mice, touch pads, and digitizing tablets. As another example, a computing device may receive input information through speech recognition or in other audible format.

Such computing devices may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, RAM, ROM, EEPROM, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computing devices or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of this embodiment, one or more computer programs that when executed perform methods of the present disclosure need not reside on a single computing device or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

The embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

What is claimed is:

1. A method for manipulating an object held in a gripper, comprising:
    determining a set of physically possible and stable displacements for moving the object relative to the gripper using a frictional push applied to the object while the object is held by the gripper; and
    applying a displacement to the object relative to the gripper according to one of the set of physically possible and stable displacements using the frictional push.

2. The method of claim 1, wherein applying the displacement to the object further comprises at least one pusher frictionally pushing the object relative to the gripper.

3. The method of claim 2, wherein the at least one pusher is a robot arm.

4. The method of claim 2, wherein the at least one pusher is a stationary surface the object is frictionally pushed against.

5. The method of claim 2, wherein determining the set of displacements comprises generating a motion cone comprising physically possible and stable displacements.

6. The method of claim 5, wherein the act of generating the motion cone is determined responsive to one or more parameters comprising gravity, a mass of the object, a coefficient of friction between the gripper and the object, a coefficient of friction between the object and the pusher, and/or a position and orientation of the object relative to the gripper.

7. The method of claim 5, wherein the act of generating the motion cone includes determining a stable motion cone based at least partly on an upper threshold frictional force and/or a lower threshold frictional force.

8. The method of claim 5, wherein determining the set of displacements further comprises determining an approximation of the motion cone.

9. The method of claim 8, wherein the approximation of the motion cone is a polyhedral cone approximation of the motion cone.

10. The method of claim 1, further comprising iteratively sampling from the set of possible displacements to choose a displacement for applying to the object using a frictional push.

11. The method of claim 10, wherein iteratively sampling comprises random sampling.

12. The method of claim 11, wherein random sampling comprises prioritizing samples according to a cost-analysis system.

13. The method of claim 1, further comprising varying a force exerted by the gripper on the object.

14. The method of claim 13, wherein varying the force exerted by the gripper on the object further comprises modifying the set of physically possible and stable displacements for moving the object relative to the gripper using the frictional push applied to the object.

15. A method for manipulating an object held in a gripper from a first position to a second position relative to the gripper, the method comprising:
    planning each displacement of a sequence of displacements for the object relative to the gripper, wherein the planning of each displacement comprises:
        determining a set of physically possible and stable displacements for moving the object relative to the gripper using a frictional push applied to the object based at least on a current position and orientation of the object relative to the gripper within the sequence;
        selecting a displacement of the object relative to the gripper according to one of the set of physically possible and stable displacements;
        adding the selected displacement to the sequence of displacements; and
    executing the sequence of displacements such that the object moves from the first position to the second position by applying a sequence of frictional pushes to the object while the object is held by the gripper.

16. The method of claim 15, wherein executing the sequence of displacements comprises a pusher frictionally pushing the object relative to the gripper.

17. The method of claim 15, wherein executing the sequence of displacements comprises the gripper frictionally pushing the object against a stationary surface.

18. The method of claim 17, wherein determining the set of displacements comprises generating a motion cone comprising physically possible and stable displacements for at least a first position and orientation of the object held in the gripper.

19. The method of claim 18, wherein the act of generating the motion cone is determined responsive to one or more parameters comprising gravity, a mass of the object, a coefficient of friction between the gripper and the object, a coefficient of friction between the object and a pusher, and/or a current position and orientation of the object relative to the gripper.

20. The method of claim 19, wherein the act of generating the motion cone includes determining a stable motion cone based at least partly on an upper threshold frictional force and/or a lower threshold frictional force.

21. The method of claim 18, wherein generating the motion cone further comprises modifying the set of physically possible and stable displacements by varying a force exerted by the gripper on the object.

22. The method of claim 21, wherein executing the sequence of displacements further comprises varying a force exerted by the gripper on the object during at least one of the sequence of displacements.

23. The method of claim 15, wherein selecting the displacement further comprises:
    iteratively sampling from the set of displacements;
    filtering the set of displacements according to a predetermined cost to provide a filtered set of displacements; and choosing the selected displacement according to a closest displacement in the motion cone to a displacement from the filtered set.

24. The method of claim 23, wherein adding the selected displacement to the sequence of displacements further comprises updating a list of positions comprising at least the first position to include a new position according to the selected displacement, and wherein choosing the selected displacement further comprises choosing a position from the list of positions closest to the displacement from the filtered set from which to apply the displacement.

25. A system for manipulating an object held in a gripper, comprising:
an actuator configured to control motion of the gripper;
a processing unit in communication with the actuator, wherein the processing unit is configured to:
determine a set of physically possible and stable displacements for moving the object relative to the gripper using a frictional push applied to the object; and
direct the actuator to apply a displacement to the object relative to the gripper according to one of the set of physically possible and stable displacements using the frictional push while the object is held by the gripper.

26. The system of claim 25, further comprising at least one pusher configured to frictionally push the object relative to the gripper.

27. The system of claim 26, wherein the at least one pusher is a robot arm.

28. The system of claim 26, wherein the at least one pusher is a stationary surface the object is frictionally pushed against.

29. The system of claim 26, wherein the processing unit is configured to determine a motion cone comprising physically possible and stable displacements.

30. The system of claim 29, wherein the processing unit is configured to determine the motion cone based at least partly on one or more parameters comprising gravity, a mass of the object, a coefficient of friction between the gripper and the object, a coefficient of friction between the object and the pusher, and/or a position and orientation of the object relative to the gripper.

31. The system of claim 29, wherein the processing unit is configured to determine the motion cone by determining a stable motion cone based at least partly on an upper threshold frictional force and/or a lower threshold frictional force.

32. The system of claim 29, wherein the processing unit is configured to calculate an approximation of the motion cone.

33. The system of claim 32, wherein the approximation of the motion cone is a polyhedral cone approximation of the motion cone.

34. The system of claim 25, wherein the processing unit is configured to iteratively sample from the set of displacements and choose a displacement to be applied using the frictional push.

35. The system of claim 34, wherein the processing unit is configured for random sampling.

36. The system of claim 35, wherein the processing unit is configured to prioritize samples according to a cost-analysis system.

37. The system of claim 25, wherein the actuator is configured to vary a force exerted by the gripper on the object.

38. The system of claim 37, wherein the processing unit is configured to vary the force exerted by the gripper on the object to modify the set of physically possible and stable displacements for moving the object relative to the gripper using the frictional push applied to the object.

39. A system for manipulating an object held in a gripper, comprising:
an actuator configured to control motion of the gripper;
a processing unit in communication with the actuator, wherein the processing unit is configured to:
plan each displacement of a sequence of displacements for the object relative to the gripper, wherein to plan each displacement the processing unit is further configured to:
determine a set of physically possible and stable displacements for moving the object relative to the gripper using a frictional push applied to the object based at least on a current position and orientation of the object relative to the gripper within the sequence;
select a displacement of the object relative to the gripper according to one of the set of physically possible and stable displacements; and
add the selected displacement to the sequence of displacements; and
direct the actuator to apply the sequence of displacements to the object relative to the gripper using the frictional push while the object is held by the gripper.

40. The system of claim 39, further comprising at least one pusher configured to frictionally push the object relative to the gripper.

41. The system of claim 40, wherein the at least one pusher is a robot arm.

42. The system of claim 40, wherein the at least one pusher is a stationary surface the object is frictionally pushed against.

43. The system of claim 39, wherein the processing unit is configured to generate a motion cone comprising physically possible and stable displacements for at least the current position and orientation of the object relative to the gripper.

44. The system of claim 43, wherein the processing unit is configured to generate the motion cone based at least partly on one or more parameters comprising gravity, a mass of the object, a coefficient of friction between the gripper and the object, a coefficient of friction between the object and the pusher, and/or the current position and orientation of the object relative to the gripper.

45. The method of claim 43, wherein the processing unit is configured to generate the motion cone by determining a stable motion cone based at least partly on an upper threshold frictional force and/or a lower threshold frictional force.

46. The system of claim 43, wherein the processing unit is configured to calculate an approximation of the motion cone.

47. The system of claim 46, wherein the approximation of the motion cone is a polyhedral cone approximation of the motion cone.

48. The system of claim 39, wherein the processing unit is configured to iteratively sample from the set of displacements and choose a displacement to be applied using the frictional push.

49. The system of claim 48, wherein the processing unit is configured for random sampling.

50. The system of claim 49, wherein the processing unit is configured to prioritize samples according to a cost-analysis system.

51. The system of claim 39, wherein the actuator is configured to vary a force exerted by the gripper on the object.

52. The system of claim 51, wherein the processing unit is configured to vary the force exerted by the gripper on the object to modify the set of physically possible and stable displacements for moving the object relative to the gripper using the frictional push applied to the object.

* * * * *